United States Patent
Katanoda

(10) Patent No.: US 11,473,530 B2
(45) Date of Patent: Oct. 18, 2022

(54) HYBRID ROCKET

(71) Applicant: Kagoshima University, Kagoshima (JP)

(72) Inventor: Hiroshi Katanoda, Kagoshima (JP)

(73) Assignee: KAGOSHIMA UNIVERSITY, Kagoshima (JP)

( * ) Notice: Subject to any disclaimer, the term of this patent is extended or adjusted under 35 U.S.C. 154(b) by 0 days.

(21) Appl. No.: 17/255,696

(22) PCT Filed: Jun. 27, 2019

(86) PCT No.: PCT/JP2019/025607
§ 371 (c)(1),
(2) Date: Dec. 23, 2020

(87) PCT Pub. No.: WO2020/012971
PCT Pub. Date: Jan. 16, 2020

(65) Prior Publication Data
US 2021/0277847 A1    Sep. 9, 2021

(30) Foreign Application Priority Data

Jul. 9, 2018 (JP) ............................. JP2018-130158
Jul. 13, 2018 (JP) ............................. JP2018-132797

(51) Int. Cl.
*F02K 9/72* (2006.01)
*F02K 9/12* (2006.01)
(Continued)

(52) U.S. Cl.
CPC ............... *F02K 9/72* (2013.01); *B64G 1/404* (2013.01); *F02K 9/12* (2013.01); *F02K 9/50* (2013.01); *F02K 9/605* (2013.01)

(58) Field of Classification Search
CPC ..... F02K 9/12; F02K 9/14; F02K 9/44; F02K 9/50; F02K 9/605; F02K 9/72; B64G 1/402; B64G 1/404
See application file for complete search history.

(56) References Cited

U.S. PATENT DOCUMENTS 3,423,943 A    1/1969 Stark
3,744,427 A *  7/1973 Good ........................ F02K 9/72
                                              102/285
(Continued)

FOREIGN PATENT DOCUMENTS

CN    106870206 A    6/2017
JP    46-039645 B    6/1972
(Continued)

*Primary Examiner* — Todd E Manahan
*Assistant Examiner* — Kyle Robert Thomas
(74) *Attorney, Agent, or Firm* — K&L Gates LLP; Louis C. Cullman; Hal Gibson

(57) ABSTRACT

A readily combustible portion (110) includes a readily combustible exposed surface (111) that is exposed to a flow channel (CA). A combustion-resistant portion (140), which comprises a material that is more resistant to combustion than the readily combustible portion (110), covers an outer surface of the readily combustible portion (110) on the opposite side from the readily combustible exposed surface (111) in a direction orthogonal to a length direction parallel to a direction in which a hybrid rocket is propelled. The combustion-resistant portion (140) includes a thick portion (120) that serves as a stopper that prevents peeling of the readily combustible portion (110) from the combustion-resistant portion (140) in a direction from a starting end surface (100a) toward a terminating end surface (100b).

5 Claims, 16 Drawing Sheets

(51) Int. Cl.
*F02K 9/50* (2006.01)
*B64G 1/40* (2006.01)
*F02K 9/60* (2006.01)

(56) References Cited

U.S. PATENT DOCUMENTS

| | | | | |
|---|---|---|---|---|
| 5,582,001 A | * | 12/1996 | Bradford | F02K 9/72 60/211 |
| 6,092,366 A | * | 7/2000 | Smith | F02K 9/72 60/257 |
| 2013/0042596 A1 | * | 2/2013 | Fuller | C06B 45/00 118/696 |
| 2016/0194256 A1 | * | 7/2016 | Whitmore | C06B 21/0033 149/109.6 |

FOREIGN PATENT DOCUMENTS

| | | | |
|---|---|---|---|
| JP | 47-009803 B | | 9/1972 |
| JP | 51-007327 A | | 3/1979 |
| JP | 2005-54649 A | | 3/2005 |
| JP | 2008-240643 A | | 10/2008 |
| JP | 2008240643 A | * | 10/2008 |

* cited by examiner

HYBRID ROCKET

RELATED APPLICATIONS

This application is an application under 35 U.S.C. § 371 of International Patent Application PCT/JP2019/025607, filed on Jun. 27, 2019, which claims the benefit of Japanese Patent Application No. 2018-130158, filed on Jul. 9, 2018, and Japanese Patent Application No. 2018-132797, filed on Jul. 13, 2018, the disclosures of all of which are incorporated herein by reference in their entirety.

TECHNICAL FIELD

The present disclosure relates to a solid fuel and a hybrid rocket.

BACKGROUND ART

Hybrid rockets are known in which fuel that is solid (hereinafter referred to as "solid fuel") is caused to combust by supplying an oxidant that is liquid (hereinafter referred to as "liquid oxidant") to the solid fuel, and thrust is obtained by ejecting the combustion gas produced by the combustion. In this description, the term "hybrid" means that both a solid and a liquid material are used to obtain thrust.

The solid fuel defines a flow channel extending in a direction in which the hybrid rocket is propelled. The liquid oxidant is sprayed into the flow channel. As a result, the solid fuel combusts in a mode in which a flow of combustion gas is produced in the flow channel.

As such a solid fuel, Patent Literature 1 discloses a solid fuel having a configuration in which a readily combustible portion, formed from a material that combusts relatively easily, and a combustion-resistant portion, formed from a material that is relatively resistant to combustion, are disposed in an alternating manner in the direction in which the hybrid rocket is propelled.

CITATION LIST

Patent Literature

Patent Literature 1: Examined Japanese Patent Publication No. S46-39645

SUMMARY OF INVENTION

Technical Problem

Solid fuels combust while housed in a casing. With the configuration of the solid fuel according to Patent Literature 1, at the point in time when the readily combustible portion has burned down prior to the combustion-resistant portion, the inner surface of the casing is exposed at the location where the readily combustible portion is disposed. Consequently, there is a concern that the casing will be damaged due to combustion of the remaining combustion-resistant portion.

Note that, if the readily combustible portion is disposed on the inside near the flow channel in a direction orthogonal to the direction in which the hybrid rocket is propelled and the combustion-resistant portion is disposed on the outside near the inner surface of the casing, the inner surface of the casing will not be exposed at the point in time when the readily combustible portion has burned down. With such a configuration, it is possible to avoid the problem of the casing being damaged.

However, when using this configuration, shearing forces may act on the interface between the readily combustible portion and the combustion-resistant portion due to the flow of combustion gas flowing in the flow channel. This causes a new problem of the readily combustible portion being more likely to peel from the combustion-resistant portion.

An objective of the present disclosure is to provide a solid fuel which, regardless of including a readily combustible portion and a combustion-resistant portion, the casing housing the readily combustible portion and the combustion-resistant portion is unlikely to be damaged and, moreover, the readily combustible portion is unlikely to peel from the combustion-resistant portion in the process of combustion; and a hybrid rocket including this solid fuel.

Solution to Problem

A solid fuel according to the present disclosure that achieves the objective described above is:

A solid fuel in which openings are formed on both end surfaces in a length direction parallel to a direction in which a rocket is propelled, the solid fuel defining therein a flow channel communicating between the opening of a starting end surface that is one end surface in the length direction and the opening of a terminating end surface that is another end surface, the solid fuel being housed in a casing that constitutes a portion of the rocket and providing thrust to the rocket by combusting in a mode in which a flow of combustion gas, flowing in a direction from the starting end surface toward the terminating end surface, is produced in the flow channel, the solid fuel including:

a readily combustible portion including a readily combustible exposed surface exposed to the flow channel; and a combustion-resistant portion covering an outer surface, opposite the readily combustible exposed surface in a direction orthogonal to the length direction, of the readily combustible portion, the combustion-resistant portion comprising a material that is more resistant to combustion than the readily combustible portion;

wherein the combustion-resistant portion includes a stopper that prevents peeling of the readily combustible portion in the direction from the starting end surface toward the terminating end surface.

A configuration is possible in which the solid fuel is divided into a plurality of blocks in the length direction, and each of the blocks includes the readily combustible portion including the readily combustible exposed surface, and the combustion-resistant portion including the stopper.

A configuration is possible in which, in each of the blocks, the combustion-resistant portion includes a shape covering the outer surface and the both end surfaces in the length direction of the readily combustible portion, and a portion, covering an end surface of the readily combustible portion closer to the terminating end surface among the both end surfaces of the combustion-resistant portion constitutes a stopper for the readily combustible portion.

A configuration is possible in which, in each of the blocks, the combustion-resistant portion includes a shape in which an opening is formed in each of a first end surface that is one end surface in the length direction and a second end surface that is another end surface and, also, an area of the opening of the first end surface is smaller than an area of the opening of the second end surface, and a portion of the combustion-resistant portion constituting the first end surface constitutes a stopper for the readily combustible portion of the block including the combustion-resistant portion, or for the readily combustible portion of the block adjacent to the block at a position closer to the starting end surface than the block.

A configuration is possible in which the first end surface is disposed at a position closer to the starting end surface than the second end surface, and a portion of the combustion-resistant portion constituting the first end surface constitutes the stopper for the readily combustible portion of the block adjacent to the block at a position closer to the starting end surface than the block including the combustion-resistant portion.

A configuration is possible in which the combustion-resistant portion of each of the blocks includes a thick portion that constitutes the first end surface and that includes a combustion-resistant exposed surface that is continuous with the first end surface and that is exposed to the flow channel, and a thin portion that constitutes the second end surface, covers the outer surface of the readily combustible portion, and has a thickness in the direction orthogonal to the length direction that is thinner than that of the thick portion.

A configuration is possible in which an inner surface, far from the casing in the direction orthogonal to the length direction of the combustion-resistant portion of each of the blocks is inclined so as to gradually approach the casing with proximity in the length direction to the second end surface.

A configuration is possible in which, from the opening of the starting end surface to the opening of the terminating end surface, the inner surface of the flow channel constitutes a side surface of a column having an imaginary straight line extending in the length direction as a center axis.

A hybrid rocket according to the present disclosure includes:

a solid fuel in which openings are formed on both end surfaces in a length direction, the solid fuel defining therein a flow channel communicating between the opening of a starting end surface that is one end surface in the length direction and the opening of a terminating end surface that is another end surface;

a liquid oxidizer supply device that supplies a liquid oxidizer that causes the solid fuel to oxidize to the flow channel through the opening of the starting end surface of the solid fuel, thereby causing the solid fuel to combust in a mode in which a flow of combustion gas, flowing in a direction from the starting end surface toward the terminating end surface, is produced in the flow channel;

a casing that houses the solid fuel; and a nozzle that is connected to an end of the casing and that jets the combustion gas;

wherein the solid fuel includes a readily combustible portion including a readily combustible exposed surface exposed to the flow channel, and a combustion-resistant portion covering an outer surface, opposite the readily combustible exposed surface in a direction orthogonal to the length direction, of the readily combustible portion, the combustion-resistant portion comprising a material that is more resistant to combustion than the readily combustible portion and including an inner surface that is exposed to the flow channel after the readily combustible portion burns out, thereby combusting slower than the readily combustible portion while protecting the casing, and the combustion-resistant portion includes a stopper that prevents peeling of the readily combustible portion in the direction from the starting end surface toward the terminating end surface.

A configuration is possible in which the liquid oxidizer supply device includes a tank that has an interior in which the liquid oxidizer is stored and, also, is capable of supplying, to the interior, a pressurization gas that applies pressure to a liquid surface of the liquid oxidizer in the interior, a gas discharger that is provided in the tank and that discharges gas, obtained by the liquid oxidizer vaporizing in the interior, out of the tank, a supply pipe that includes an inflow end through which the liquid oxidizer flows in, and an outflow end through which the liquid oxidizer flows out, the inflow end being immersed in the liquid oxidizer in the interior of the tank, the outflow end being connected to the flow channel of the solid fuel disposed downward from the tank, the supply pipe constituting a pipe passage through which the liquid oxidizer flows from the inflow end to the outflow end, and a gas valve capable of switching between a pressurization stop state in which a supply of the pressurization gas to the tank is cut off and, also, the gas is discharged from the gas discharger, and a pressurization state in which the discharging of the gas from the gas discharger is cut off and, also, the pressurization gas is supplied to the tank and, thereby, the liquid oxidizer is pushed by the pressurization gas from the inflow end through the outflow end and to the flow channel of the solid fuel, wherein the supply pipe includes, between the inflow end and the outflow end along the pipe passage, an upward protrusion protruding upward from the tank, the upward protrusion constituting a portion of the pipe passage, and in a case in which the gas valve is set to the pressurization stop state, when the liquid oxidizer is injected into the tank, a void from at least the upper protrusion to the outflow end of the pipe passage is secured.

A configuration is possible in which the supply pipe includes an upward guide including one end that constitutes the inflow end and another end that is connected to the upward protrusion, the upward guide guiding the liquid oxidizer upward from the inflow end toward the upward protrusion, a turn-back that constitutes the upward protrusion, the turn-back turning the liquid oxidizer that is guided upward by the upward guide back toward the interior of the tank, and a downward guide including one end that is connected to the turn-back and another end that constitutes the outflow end, the downward guide guiding the liquid oxidizer, that is turned back downward at the turn-back, downward toward the flow channel of the solid fuel.

A configuration is possible in which the downward guide guides the liquid oxidizer, that is turned back downward at the turn-back, downward through the interior of the tank toward the flow channel of the solid fuel.

A configuration is possible in which the hybrid rocket further includes a gas guide pipe for guiding, to the flow channel of the solid fuel, the gas discharged from the gas discharger.

A configuration is possible in which the gas guide pipe connects the gas discharger and a portion of the supply pipe constituting the void, and the gas discharged from the gas discharger is supplied to the flow channel of the solid fuel through the gas guide pipe and the void.

A configuration is possible in which the supply pipe includes an outer pipe including one end that constitutes the inflow end and another end that constitutes the upward protrusion, and an inner pipe that passes through an interior of the outer pipe, the inner pipe including one end that is open to an interior of the upward protrusion, and another end that constitutes the outflow end, and the liquid oxidizer is guided upward from the inflow end toward the upward protrusion by an inner surface of the outer pipe and an outer surface of the inner pipe, the liquid oxidizer flows into the one end of the inner pipe in the upward protrusion, and the liquid oxidizer that has flowed in is guided to the flow channel of the solid fuel by the inner pipe.

Advantageous Effects of Invention

According to the solid fuel of the present disclosure, the combustion-resistant portion covers the outer surface of the readily combustible portion and, as such, it is possible to avoid the problem of the casing being exposed to the flow channel at the point in time when the readily combustible portion has burned down. As a result, the casing housing the readily combustible portion and the combustion-resistant portion is unlikely to be damaged.

Additionally, since the combustion-resistant portion includes the stopper that prevents the peeling of the readily combustible portion, the readily combustible portion is unlikely to peel from the combustion-resistant portion in the process of combustion.

DESCRIPTION OF EMBODIMENTS

Figure 1:
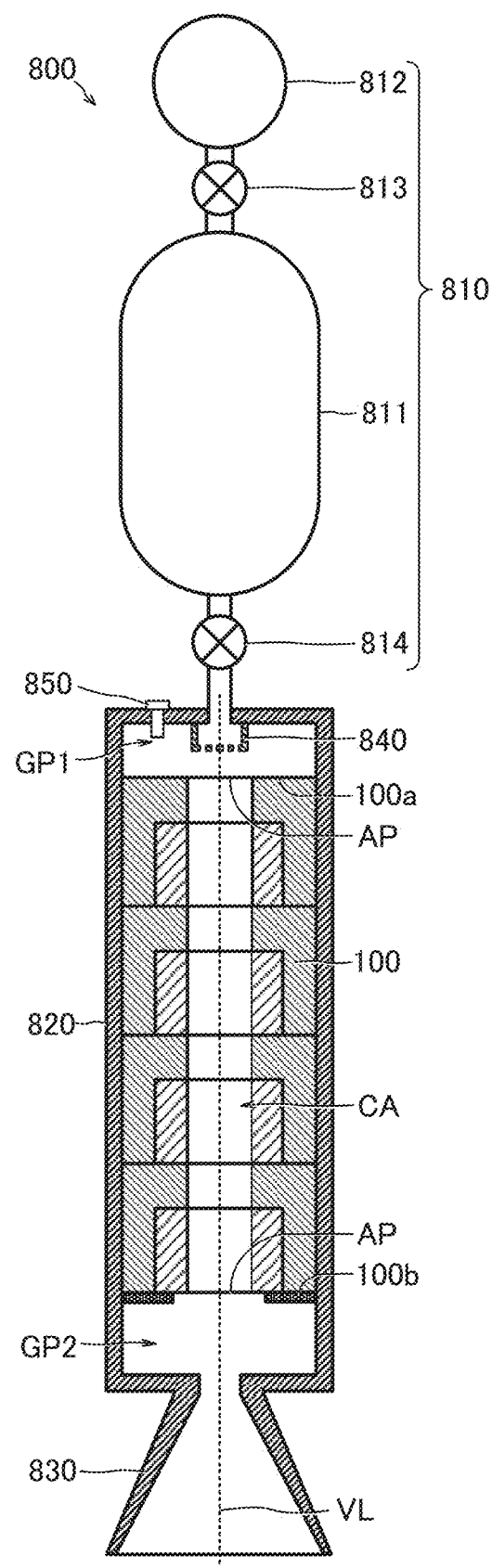
FIG. 1 is a conceptual drawing illustrating the configuration of a hybrid rocket according to Embodiment 1.

In the following, hybrid rockets according to Embodiments 1 to 10 are described while referencing the drawings. In the drawings, identical or corresponding components are marked with the same reference numerals.

Embodiment 1

As illustrated in FIG. 1, a hybrid rocket 800 according to the present embodiment includes a solid fuel 100 that is combusted to produce thrust. The solid fuel 100 extends in a direction parallel to the direction in which the hybrid rocket 800 is propelled (hereinafter referred to as the "length direction").

An opening AP is formed in both end surfaces in the length direction of the solid fuel 100. The solid fuel 100 defines therein a flow channel CA that communicates between the opening AP of a starting end surface 100a that is one of the end surfaces in the length direction, and the opening AP of a terminating end surface 100b that is the other end surface.

Specifically, the solid fuel 100 is formed in a hollow cylinder shape having an imaginary straight line VL extending in the length direction as the center axis. An inner surface of the flow channel CA constitutes a side surface of a cylindrical column having the imaginary straight line VL as the center axis, from the opening AP of the starting end surface 100a to the opening AP of the terminating end surface 100b.

Additionally, the hybrid rocket 800 includes a liquid oxidizer supply device 810 that supplies a liquid oxidizer to the solid fuel 100. The liquid oxidizer supply device 810 includes a tank 811 in which the liquid oxidizer is stored, and a pressurization gas source 812 that supplies, to the tank 811, an inert gas for pushing the liquid oxidizer in the tank 811 toward the solid fuel 100.

Additionally, the liquid oxidizer supply device 810 includes a gas valve 813 provided on a flow path of the inert gas from the pressurization gas source 812 to the tank 811, and a liquid valve 814 provided on a flow path of the liquid oxidizer from the tank 811 to the solid fuel 100.

Additionally, the hybrid rocket 800 includes a casing 820 that houses the solid fuel 100, and a nozzle 830 connected to an end of the casing 820. The nozzle 830 is disposed at the tail of the hybrid rocket 800.

The casing 820 is formed from a metal material, specifically, stainless steel. The casing 820 is formed in a hollow cylinder shape having the imaginary straight line VL as the center axis, and covers an outer peripheral surface of the solid fuel 100. The solid fuel 100 combusts while housed in the casing 820.

A gap GP1 serving as a front combustion chamber is secured between the starting end surface 100*a* of the solid fuel 100 and an inner wall of the end of the casing 820 on the side opposite the nozzle 830 in the length direction parallel to the imaginary straight line VL. The gap GP1 communicates with the flow channel CA. The tank 811 described above communicates with the gap GP1 via the liquid valve 814.

Moreover, the hybrid rocket 800 includes an atomizer 840 disposed in the gap GP1, and an igniter 850 disposed so as to face the gap GP1.

The atomizer 840 atomizes the liquid oxidizer supplied from the tank 811. The atomized liquid oxidizer flows into the flow channel CA through the opening AP of the starting end surface 100*a* of the solid fuel 100. That is, the liquid oxidizer supply device 810 supplies the liquid oxidizer through the atomizer 840 to the flow channel CA of the solid fuel 100.

Additionally, a gap GP2 is secured between an inner wall of the casing 820 of the end to which the nozzle 830 is connected, and the terminating end surface 100*b* of the solid fuel 100. The gap GP2 communicates with the flow channel CA, and fulfills a role as a rear combustion chamber for bringing the combustion of the pyrolysis gas produced by pyrolyzing the solid fuel 100 closer to complete combustion.

Hereinafter, the operations of the hybrid rocket 800 are described. Firstly, the igniter 850 produces high-temperature fuel gas. The fuel gas produced by the igniter 850 flows into the flow channel CA, and the solid fuel 100 is placed in a partially pyrolyzed state.

In this state, the gas valve 813 and the liquid valve 814 are opened. As a result, the inert gas in the pressurization gas source 812 pushes the liquid oxidizer in the tank 811 toward the gap GP1. The pushed liquid oxidizer is atomized in the atomizer 840 and flows into the flow channel CA.

Then, the atomized liquid oxidizer reaches the vicinity of the inner wall surface of the flow channel CA and, as a result, the fuel gas combusts. Due to this, flames and pyrolysis gas resulting from the pyrolization of the inner surface of the solid fuel 100 facing the flow channel CA are produced. The pyrolysis gas and the flames flow in the flow channel CA in the direction from the starting end surface 100*a* toward the terminating end surface 100*b*.

In this process, combustion gas is produced as a result of the pyrolysis gas combusting due to the flames, the heat of that combustion gas causes the surface layer portion of the un-combusted solid fuel 100 to pyrolyze and produce pyrolysis gas, and that pyrolysis gas then combusts. Thus, the solid fuel 100 combusts in a mode in which a flow of combustion gas, flowing in the direction from the starting end surface 100*a* toward the terminating end surface 100*b*, is produced in the flow channel CA.

A fluid including the combustion gas, the pyrolysis gas, and the flames that flows out from the opening AP of the terminating end surface 100*b* is mixed in the gap GP2 serving as the rear combustion chamber. As a result, the combustion of the pyrolysis gas is brought closer to complete combustion. The combustion gas and the flames produced by the mixing in the gap GP2 are accelerated to supersonic speed and jetted by the nozzle 830. The hybrid rocket 800 obtains thrust and is propelled by the reaction to the jetting.

The hybrid rocket 800 according to the present embodiment is characterized by the configuration of the solid fuel 100. As such, hereinafter, the configuration of the solid fuel 100 is described while referencing FIG. 2.

Figure 2:
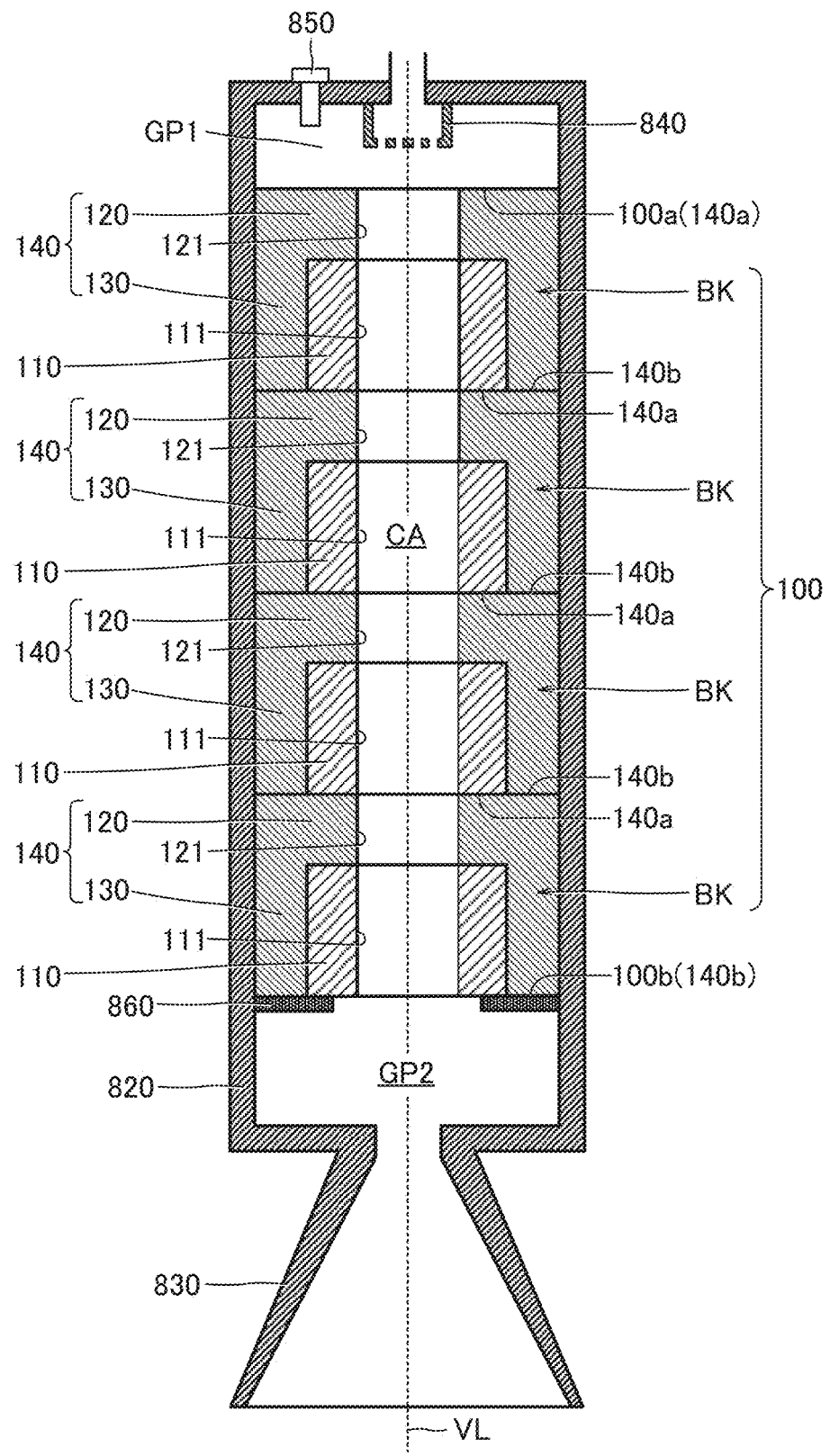
FIG. 2 is a cross-sectional view illustrating the configuration of a solid fuel according to Embodiment 1.

As illustrated in FIG. 2, the solid fuel 100 is divided into four blocks BK in the length direction parallel to the imaginary straight line VL. Each of the blocks BK is formed in a hollow cylinder shape having the imaginary straight line VL as the center axis. The four blocks BK have the same configuration. Hereinafter, the configuration of each of the blocks BK is described.

Each of the blocks BK includes a readily combustible portion 110 formed from a material that combusts relatively easily and a combustion-resistant portion 140 formed from a material that is more resistant to combustion than the readily combustible portion 110.

Here, the phrase "more resistant to combustion than the readily combustible portion 110" means that although it is possible to violently combust enough to provide thrust capable of propelling the hybrid rocket 800, when caused to combust under the same conditions as the material forming the readily combustible portion 110, the rate at which the volume decreases due to combustion is slower than that of the material forming the readily combustible portion 110.

Specifically, in the present embodiment, the readily combustible portion 110 is formed from paraffin, and the combustion-resistant portion 140 is formed from acrylic resin.

The readily combustible portion 110 is formed in a hollow cylinder shape having the imaginary straight line VL as the center axis. An inner circumferential surface, serving as an inner surface surrounding the imaginary straight line VL, of the readily combustible portion 110 constitutes a readily combustible exposed surface 111 that is exposed to the flow channel CA. The length in the direction parallel to the imaginary straight line VL of the readily combustible portion 110 is shorter than the length in the direction parallel to the imaginary straight line VL of the block BK.

Meanwhile, the length in the direction parallel to the imaginary straight line VL of the combustion-resistant portion 140 is equal to the length in the direction parallel to the imaginary straight line VL of the block BK. The combustion-resistant portion 140 is joined to the readily combustible portion 110, thereby forming a shape that, together with the readily combustible portion 110, constitutes the hollow cylinder shape block BK. Hereinafter, the shape of the combustion-resistant portion 140 is described in detail.

Both end surfaces of the combustion-resistant portion 140 in the length direction parallel to the imaginary straight line VL are open. An area of the opening of a first end surface 140*a*, which is one end surface in the length direction parallel to the imaginary straight line VL of the combustion-resistant portion 140, is smaller than an area of the opening of a second end surface 140*b*, which is the other end surface. The first end surface 140*a* is disposed closer to the starting end surface 100*a* in the length direction parallel to the imaginary straight line VL, and the second end surface 140*b* is disposed closer to the terminating end surface 100*b*.

Specifically, the combustion-resistant portion 140 includes a thick portion 120 constituting the first end surface 140*a*, and a thin portion 130 constituting the second end surface 140*b*. The thin portion 130 has a thickness in a radial direction orthogonal to the imaginary straight line VL that is thinner than that of the thick portion 120. The thin portion 130 covers the outer peripheral surface serving as an outer surface of the readily combustible portion 110. The outer peripheral surface is on the side opposite the readily combustible exposed surface 111 in the radial direction orthogonal to the imaginary straight line VL.

The thick portion 120 includes a combustion-resistant exposed surface 121 that is continuous with the first end surface 140a and is exposed to the flow channel CA. The combustion-resistant exposed surface 121 is adjacent to the readily combustible exposed surface 111 of the readily combustible portion 110. Moreover, together with the readily combustible exposed surface 111, the combustion-resistant exposed surface 121 forms the inner circumferential surface of the cylinder having the imaginary straight line VL as the center axis.

The end surface of each of the blocks BK closer to the starting end surface 100a in the length direction parallel to the imaginary straight line VL is constituted by the first end surface 140a of the thick portion 120, and the end surface closer to the terminating end surface 100b is constituted by the second end surface 140b of the thin portion 130 and the end surface of the readily combustible portion 110 closer to the terminating end surface 100b.

Moreover, of two of the blocks BK that are adjacent in the direction parallel to the imaginary straight line VL, the first end surface 140a of the thick portion 120 of the block BK closer to the terminating end surface 100b (hereinafter referred to as the "terminating end side block") contacts the end surface closer to the terminating end surface 100b of the readily combustible portion 110 of the block BK closer to the starting end surface 100a (hereinafter referred to as the "starting end side block").

As such, the portion constituting the first end surface 140a of the combustion-resistant portion 140 of the terminating end side block BK, specifically the thick portion 120, fulfills a role as a stopper that prevents the peeling, in the direction from the starting end surface 100a toward the terminating end surface 100b, of the readily combustible portion 110 of the starting end side block BK from the combustion-resistant portion 140 of the starting end side block BK.

Additionally, the hybrid rocket 800 includes a stopper 860 in the gap GP2 serving as the rear combustion chamber to prevent movement, in the direction approaching the nozzle 830, of the block BK of the final stage closest to the nozzle 830. The stopper 860 is formed from a heat-resistant material, specifically from bakelite.

The stopper 860 is fixed at a position facing the readily combustible portion 110 and the thin portion 130, which constitute the end surface closer to the nozzle 830, of the block BK of the final stage. As such, the stopper 860 prevents peeling of the readily combustible portion 110 of the block BK of the final stage in the direction from the combustion-resistant portion 140 toward the nozzle 830 of the block BK of the final stage.

Note that, the blocks BK described above can be obtained via a first process of creating the combustion-resistant portion 140, and a second process of pouring the material of the readily combustible portion 110 on the combustion-resistant portion 140. Specifically, firstly, a work material formed from acrylic resin is prepared, and the combustion-resistant portion 140 is created by machining that work material. Next, paraffin, which is the material of the readily combustible portion 110, is heated so as to become fluid, and is poured on the combustion-resistant portion 140. When the paraffin solidifies, the block BK in which the readily combustible portion 110 and the combustion-resistant portion 140 are joined is obtained.

Note that, in the first process, the combustion-resistant portion 140 may be formed by casting, in the same manner as the readily combustible portion 110. Additionally, in the second process, a mold may be used that defines both the combustion-resistant portion 140 and the space into which the material of the readily combustible portion 110 is to be poured.

As described above, according to the solid fuel 100 of the present embodiment, the thin portion 130 of the combustion-resistant portion 140 covers the outer peripheral surface of the readily combustible portion 110 and, as such, it is possible to avoid the problem of the casing 820 being exposed to the flow channel CA at the point in time when the readily combustible portion 110 has burned down.

Specifically, the inner surface of the thin portion 130 of the combustion-resistant portion 140 covering the outer peripheral surface of the readily combustible portion 110 is exposed to the flow channel CA after the readily combustible portion 110 has burned down. Moreover, the inner surface of the thin portion 130 combusts slowly compared to the readily combustible portion 110 and protects the casing 820. As a result, the casing 820 is unlikely to be damaged.

Additionally, the thick portion 120 of the combustion-resistant portion 140 of the terminating end side block BK fulfills the role as the stopper that contacts all regions of the end surface closer to the terminating end surface 100b of the readily combustible portion 110 of the starting end side block BK. As such, the readily combustible portion 110 is unlikely to peel from the combustion-resistant portion 140 in the process of combustion.

Additionally, the readily combustible exposed surface 111 and the combustion-resistant exposed surface 121 form a single curved surface. Specifically, the inner surface of the flow channel CA forms the side surface of a cylindrical column having the imaginary straight line VL as the center axis, from the opening AP of the starting end surface 100a to the opening AP of the terminating end surface 100b. As such, at an initial stage after the start of combustion, the combustion gas flows more smoothly in the flow channel CA than in a case in which unevennesses are formed on the inner surface of the flow channel CA. This contributes to improvements in the thrust provided to the hybrid rocket 800.

Additionally, the readily combustible portion 110 that combusts relatively easily is disposed at a position facing the flow channel CA. As such, at the initial stage after the start of combustion, greater thrust is obtained than in a case in which only the combustion-resistant portion 140 faces the flow channel CA. In particular, in the present embodiment, the total of the areas of all of the readily combustible exposed surfaces 111 is greater than the total of the areas of all of the combustion-resistant exposed surfaces 121. As such, the combustion gas flows in a flow channel CA in which a large amount of the readily combustible exposed surface 111 is exposed, and a large amount of thrust is easily obtained at the initial stage after the start of combustion.

Figure 3:
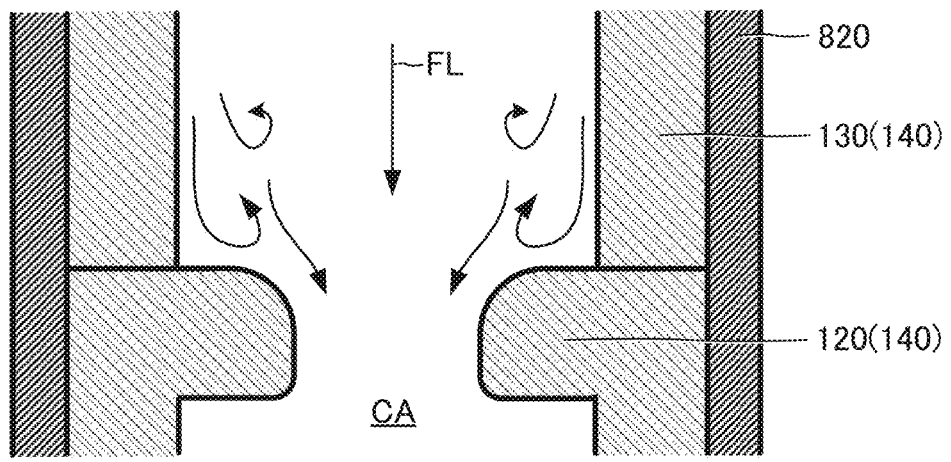
FIG. 3 is a conceptual drawing illustrating the state of the solid fuel according to Embodiment 1, after a readily combustible portion has burned out.

As illustrated in FIG. 3, after the readily combustible portion 110 has burned out, the thick portion 120, which fulfilled the role as the stopper in the combustion-resistant portion 140, is in a state protruding into the flow channel CA. As such, the thick portion 120 disrupts the flow of the fluid FL including the four components of the liquid oxidizer, the pyrolysis gas produced by pyrolyzing the combustion-resistant portion 140, the combustion gas obtained as a result of the pyrolysis gas combusting, and the flames.

Due to this disruption, the four components are mixed, thereby promoting the pyrolysis of the combustion-resistant portion 140. The promotion of the pyrolysis of the combustion-resistant portion 140 contributes to improvements in the thrust provided to the hybrid rocket 800.

Thus, the thick portion 120 not only fulfills a role as the stopper that prevents peeling of the readily combustible portion 110 in the initial stage after the start of combustion, but also fulfills a role of promoting the combustion of the combustion-resistant portion 140 itself in the stage after the readily combustible portion 110 has burned out.

Embodiment 2

In Embodiment 1 described above, in each of the blocks BK, the thick portion 120 is disposed at a position closer to the starting end surface 100a than the thin portion 130. However, a configuration is possible in which the thin portion 130 is disposed at a position closer to the starting end surface 100a than the thick portion 120. Hereinafter, a specific example of such a case is described.

Figure 4:
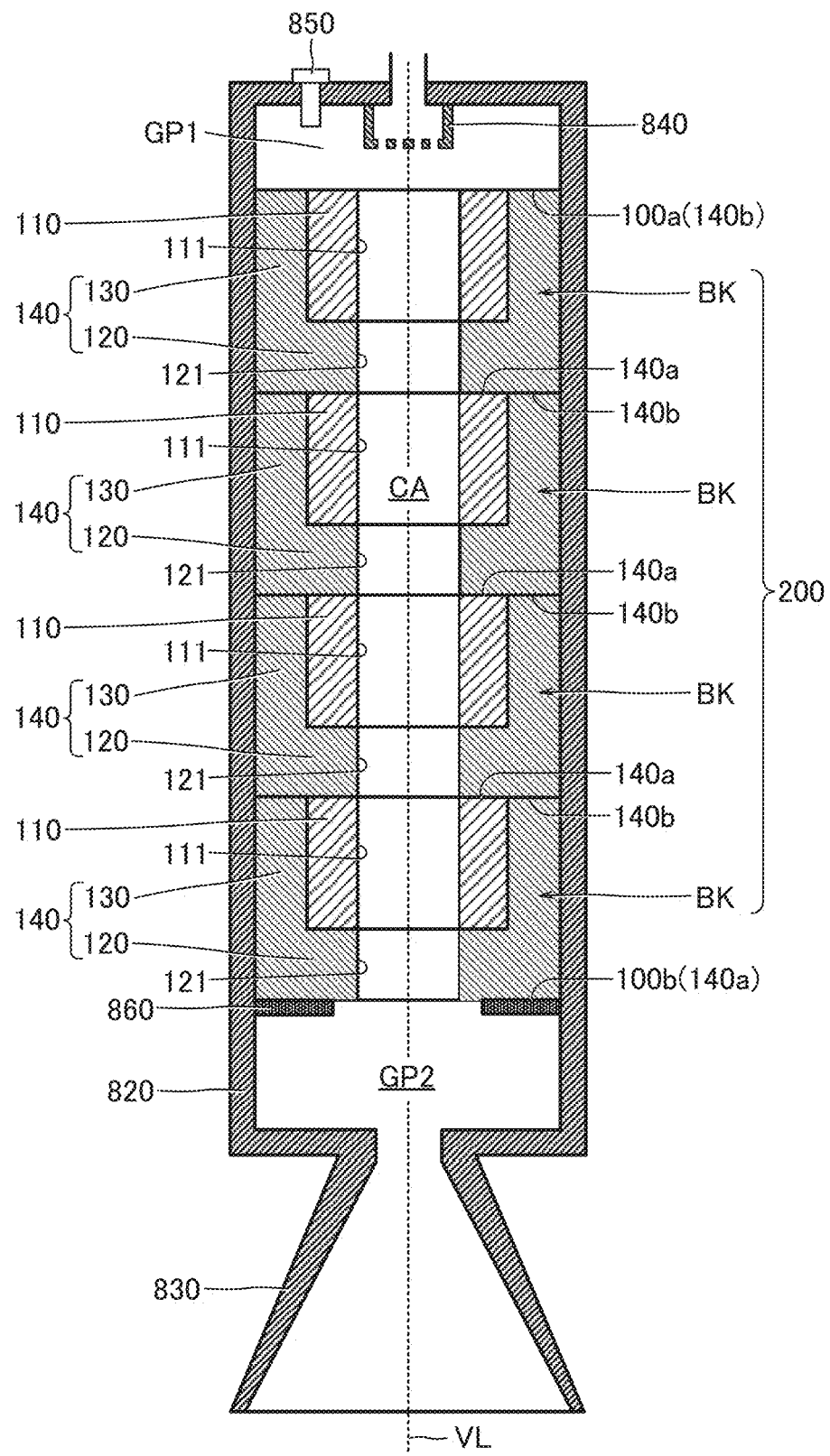
FIG. 4 is a cross-sectional view illustrating the configuration of a solid fuel according to Embodiment 2.

As illustrated in FIG. 4, in a solid fuel 200 according to the present embodiment, the first end surface 140a, which includes the opening having the smaller area, in the combustion-resistant portion 140 of each of the blocks BK is disposed closer to the terminating end surface 100b, and the second end surface 140b, which includes the opening having the larger area, is disposed closer to the starting end surface 100a.

With the solid fuel 200 according to the present embodiment, the thick portion 120, constituting the first end surface 140a, of the combustion-resistant portion 140 constitutes a stopper for the readily combustible portion 110 of the block BK that includes that combustion-resistant portion 140. The other configurations and effects are the same as in Embodiment 1.

Embodiment 3

In Embodiment 1 described above, in the initial state before combustion, not only the readily combustible exposed surface 111, but also the combustion-resistant exposed surface 121 is exposed to the flow channel CA. However, a configuration is possible in which only the readily combustible exposed surface 111 is exposed to the flow channel CA in the initial state. Hereinafter, a specific example of such a case is described.

Figure 5:
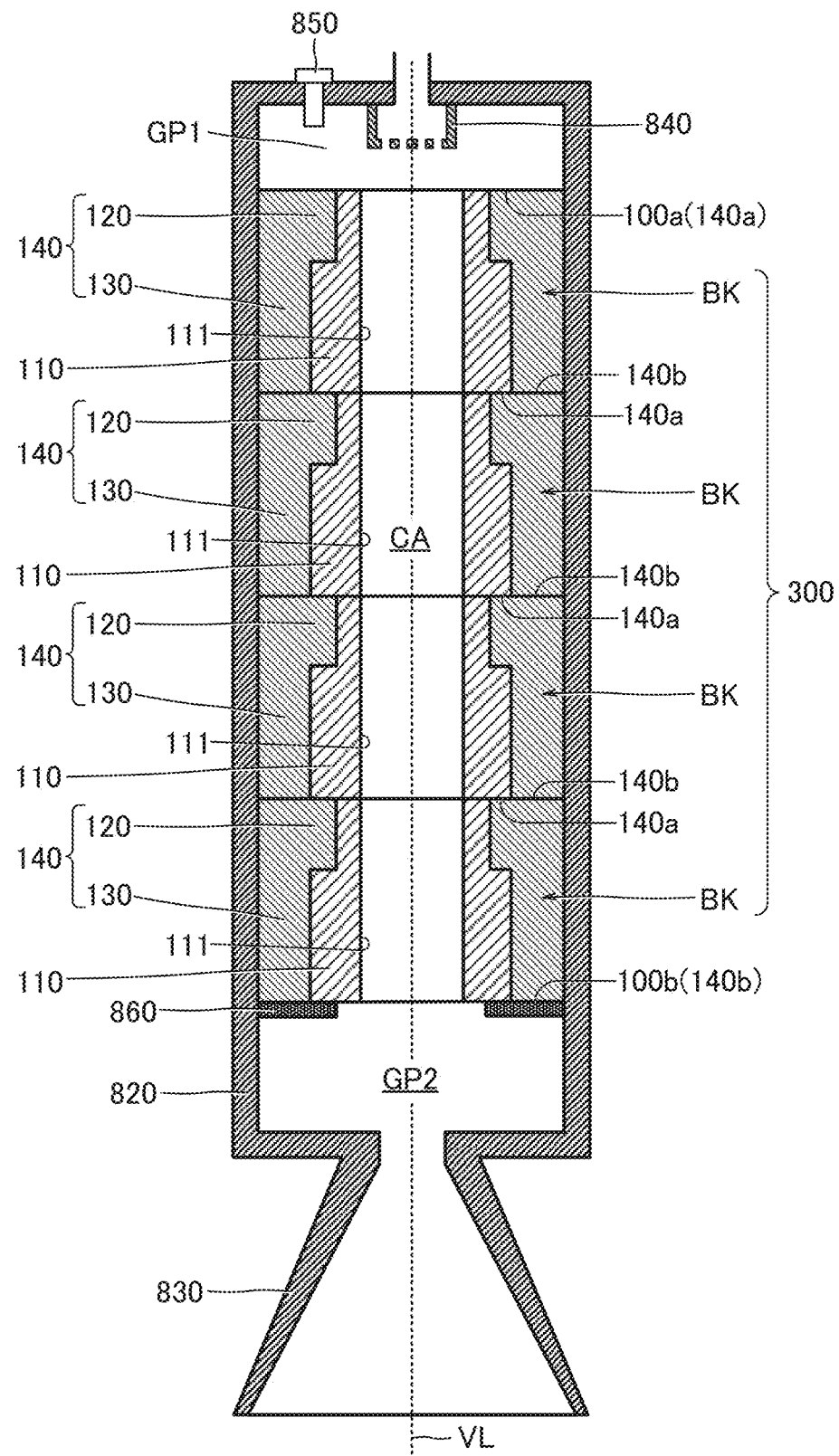
FIG. 5 is a cross-sectional view illustrating the configuration of a solid fuel according to Embodiment 3.

As illustrated in FIG. 5, in a solid fuel 300 according to the present embodiment, the thick portion 120 of the combustion-resistant portion 140 of each of the blocks BK covers the outer peripheral surface of the readily combustible portion 110 in a manner similar to the thin portion 130.

According to the present embodiment, the inner surface of the flow channel CA in the initial state is constituted by the readily combustible exposed surface 111 in all regions. As such, greater thrust than in Embodiment 1 can be obtained in the initial state after the start of combustion.

Additionally, in the present embodiment, the thick portion 120 of the combustion-resistant portion 140 of the terminating end side block BK contacts a portion of the end surface, closer to the terminating end surface 100b, of the readily combustible portion 110 of the starting end side block BK. Due to this, as in Embodiment 1, the thick portion 120 fulfills a role as a stopper for the readily combustible portion 110 of the starting end side block BK. The other configurations and effects are the same as in Embodiment 1.

Embodiment 4

In Embodiments 1 to 3 described above, an example is given of a configuration in which, in each of the blocks BK, the combustion-resistant portion 140 includes only one thick portion 120. However, a configuration is possible in which the combustion-resistant portion 140 includes a plurality of thick portions 120. Hereinafter, a specific example of such a case is described.

Figure 6:
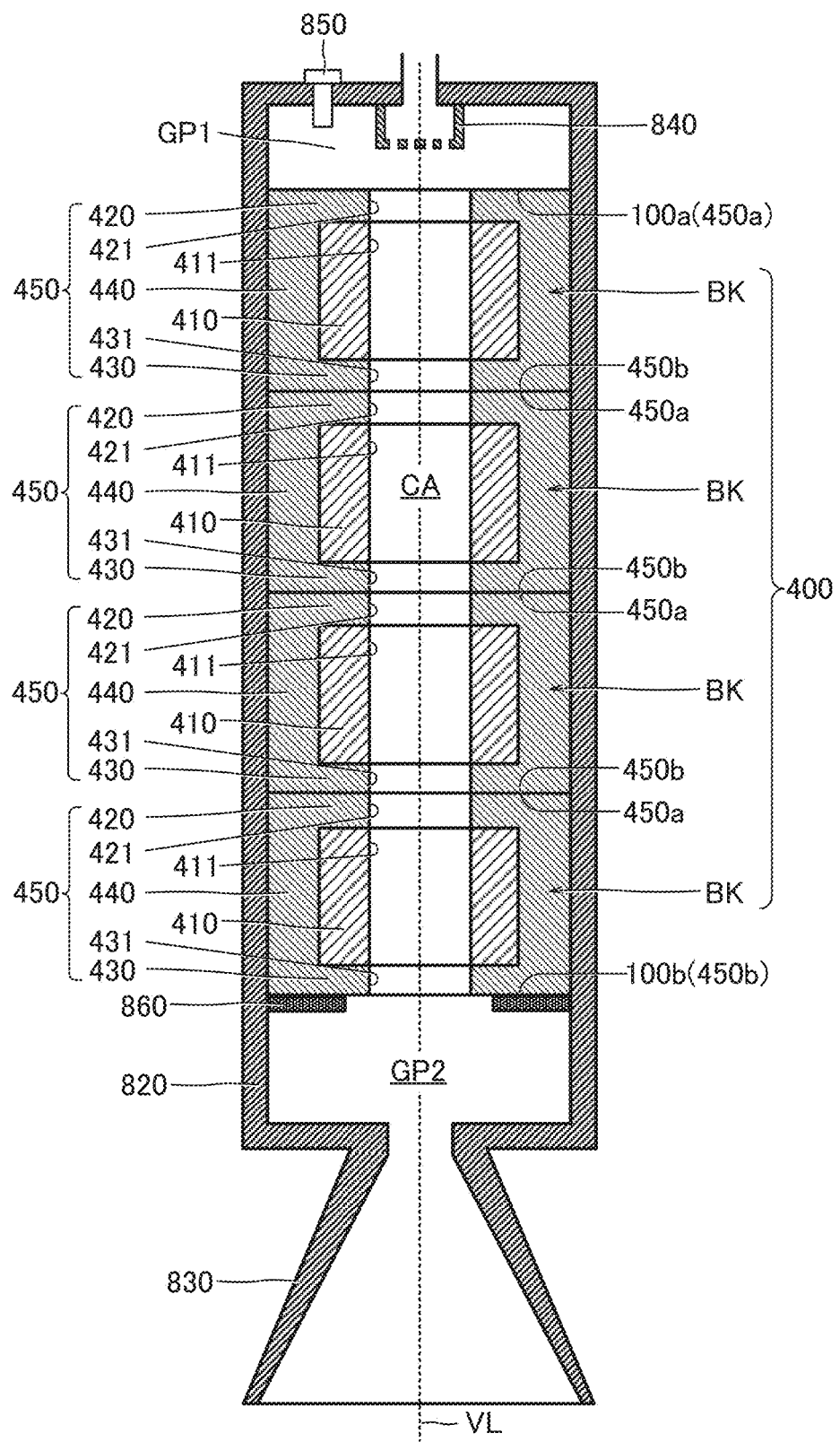
FIG. 6 is a cross-sectional view illustrating the configuration of a solid fuel according to Embodiment 4.

As illustrated in FIG. 6, a solid fuel 400 according to the present embodiment is divided into four blocks BK, in the same manner as in Embodiment 1. Each of the blocks BK is constituted by a readily combustible portion 410 and a combustion-resistant portion 450.

In each of the blocks BK, the combustion-resistant portion 450 has a shape that covers the outer peripheral surface serving as the outer surface and both end surfaces in the length direction parallel to the imaginary straight line VL of the readily combustible portion 410. Moreover, the portion of the combustion-resistant portion 450 covering the end surface, of both end surface of the readily combustible portion 410, closer to the terminating end surface 100b constitutes a stopper for that readily combustible portion 410. This is described in detail below.

In each of the blocks BK, the combustion-resistant portion 450 includes a first thick portion 420 and a second thick portion 430, and a thin portion 440 that has a thickness in the radial direction orthogonal to the length direction that is thinner than the thickness of the first thick portion 420 and the second thick portion 430.

The first thick portion 420 constitutes a first end surface 450a, which is one end surface in the length direction, of the combustion-resistant portion 450, and includes a first combustion-resistant exposed surface 421 that is continuous with the first end surface 450a and is exposed to the flow channel CA. The second thick portion 430 constitutes a second end surface 450b, which is the other end surface in the length direction, of the combustion-resistant portion 450, and includes a second combustion-resistant exposed surface 431 that is continuous with the second end surface 450b and is exposed to the flow channel CA.

The readily combustible portion 410 is disposed between the first thick portion 420 and the second thick portion 430. Both end surfaces of the readily combustible portion 410 are covered by the first thick portion 420 and the second thick portion 430. The thin portion 440 connects the first thick portion 420 to the second thick portion 430 in a state covering the outer peripheral surface serving as the outer surface of the readily combustible portion 410.

The first thick portion 420 is disposed closer to the starting end surface 100a, and the second thick portion 430 is disposed closer to the terminating end surface 100b. That is, the first thick portion 420 covers the end surface of the readily combustible portion 410 closer to the starting end surface 100a, and the second thick portion 430 covers the end surface of the readily combustible portion 410 closer to the terminating end surface 100b.

Thus, in each of the blocks BK, the second thick portion 430 constitutes a stopper for the readily combustible portion 410. The other configurations and effects are the same as in Embodiment 1.

Embodiment 5

In Embodiment 1 described above, the solid fuel 100 is divided into a plurality of blocks BK. However, a configuration is possible in which the solid fuel 100 is not necessarily divided into the plurality of blocks BK. Hereinafter, a specific example of such a case is described.

Figure 7:
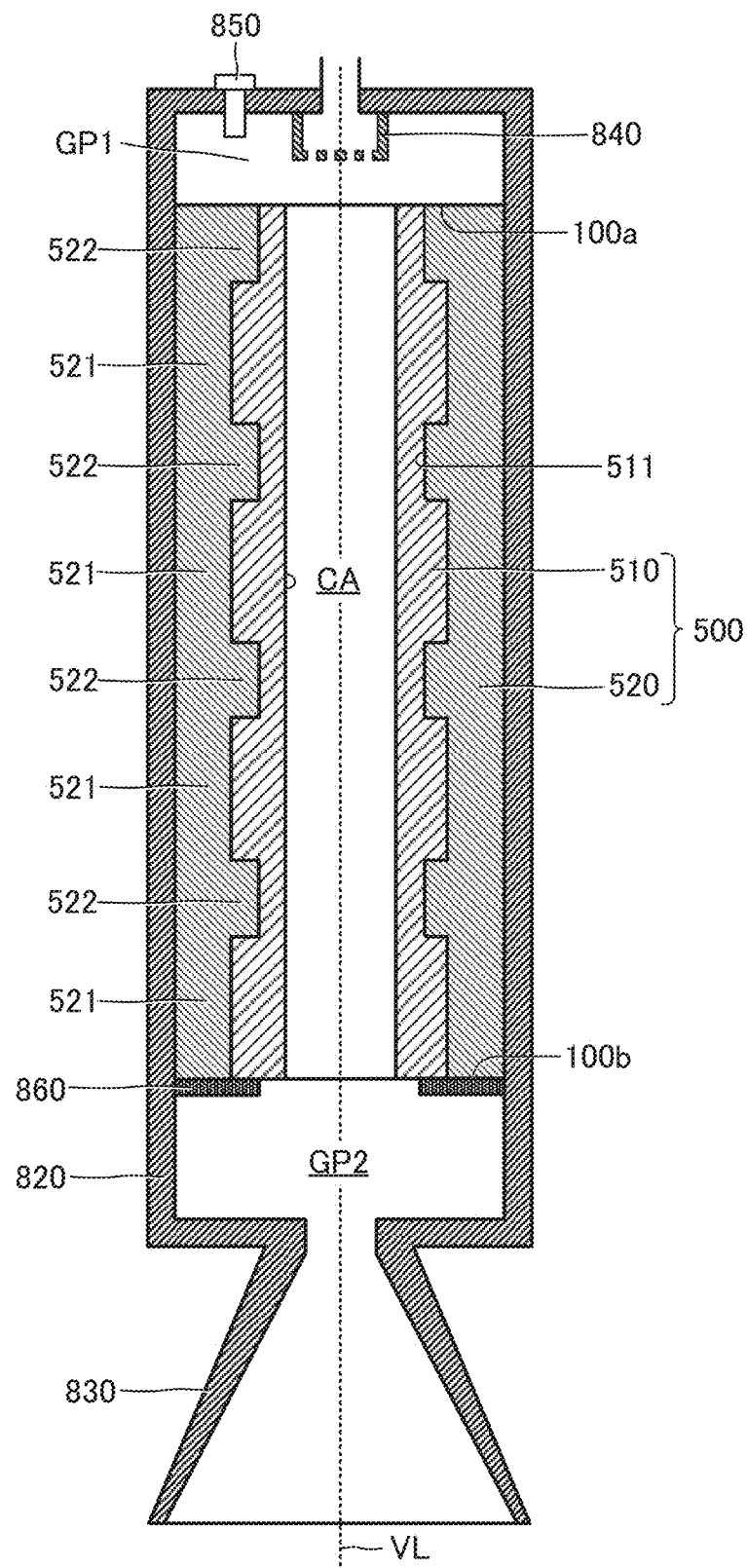
FIG. 7 is a cross-sectional view illustrating the configuration of a solid fuel according to Embodiment 5.

As illustrated in FIG. 7, a solid fuel 500 according to the present embodiment is constituted by joining a single readily combustible portion 510 and a single combustion-resistant portion 520. Each of the readily combustible portion 510 and the combustion-resistant portion 520 is formed in a cylinder shape, and extends from the starting end surface 100a to the terminating end surface 100b.

The readily combustible portion 510 is disposed on the inside, which is closer to the imaginary straight line VL than the combustion-resistant portion 520, in the radial direction orthogonal to the imaginary straight line VL. In an initial state prior to combustion of the solid fuel 500, all regions of the inner surface of the flow channel CA are constituted by the readily combustible exposed surface 511 of the readily combustible portion 510.

The combustion-resistant portion 520 has a configuration in which a plurality of thin portions 521 that have a relatively thinner thickness in the radial direction orthogonal to the imaginary straight line VL, and a plurality of thick portions 522 that have a relatively thicker thickness in the radial direction are disposed in an alternating manner in the length direction parallel to the imaginary straight line VL.

The thick portions 522 bite into the readily combustible portion 510 in a state protruding inward in the radial direction so as to be closer to the flow channel CA than the thin portion 521, and fulfill a role as stoppers that prevent peeling of the readily combustible portion 510 in the direction from the starting end surface 100a toward the terminating end surface 100b.

Additionally, similar to the thick portion 120 illustrated in FIG. 3 of the combustion-resistant portion 140 according to Embodiment 1 described above, the thick portions 522 also fulfill a role of promoting the combustion of the combustion-resistant portion 520 itself in the stage after the readily combustible portion 510 has burned out.

Embodiment 6

In Embodiment 1 described above, as the combustion-resistant portion 140 of each of the blocks BK, a constituent is used that has a shape in which the thickness in the radial direction orthogonal to the imaginary straight line VL changes in a step-like manner between the first end surface 140a and the second end surface 140b. However, a configuration is possible in which the thickness of the combustion-resistant portion 140 continuously changes from the first end surface 140a toward the second end surface 140b. Hereinafter, a specific example of such a case is described.

Figure 8:
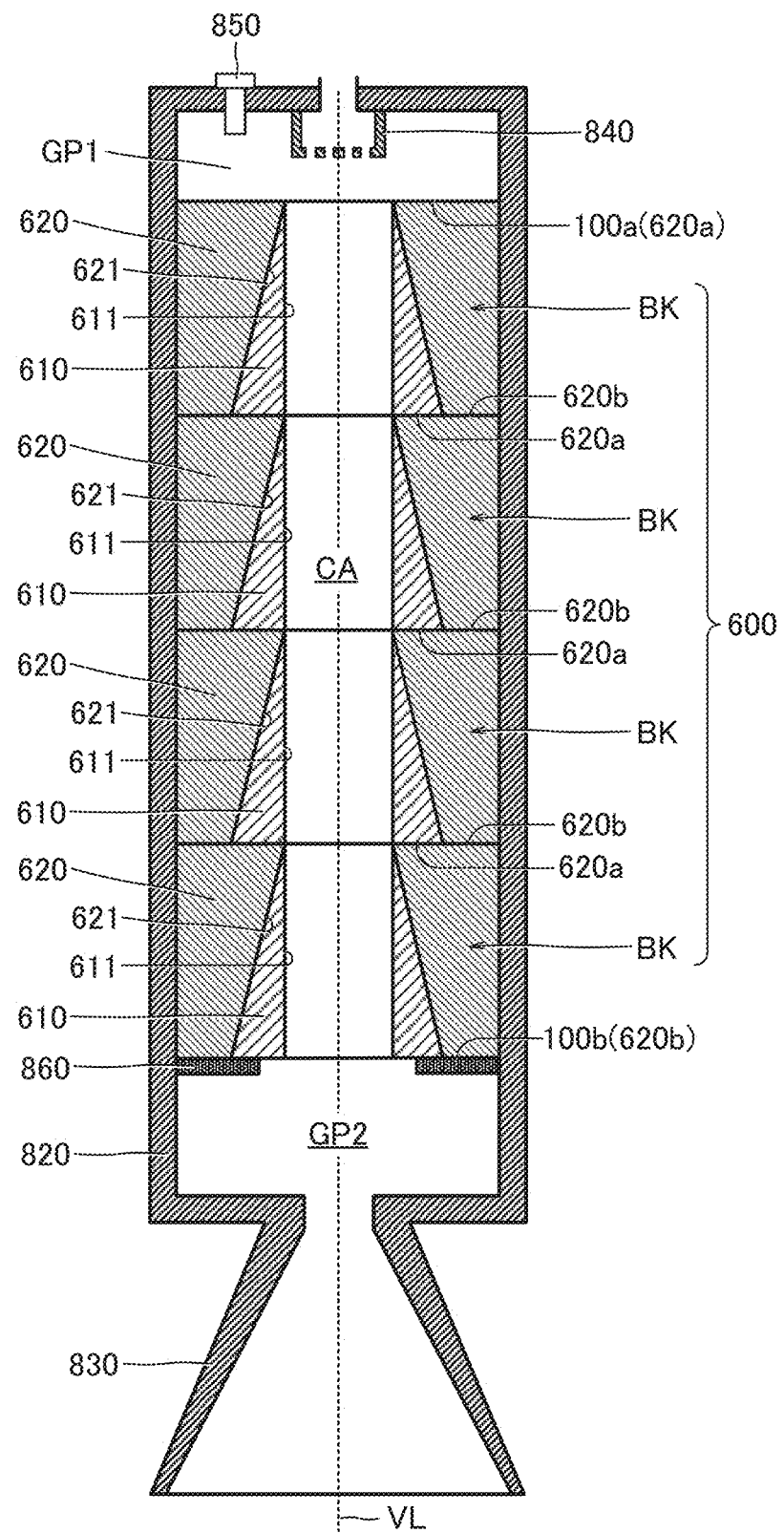
FIG. 8 is a cross-sectional view illustrating the configuration of a solid fuel according to Embodiment 6.

As illustrated in FIG. 8, a solid fuel 600 according to the present embodiment is divided into four blocks BK, in the same manner as in Embodiment 1. Each of the blocks BK is constituted by a readily combustible portion 610 and a combustion-resistant portion 620.

An area of the opening of a first end surface 620a, which is one end surface in the length direction parallel to the imaginary straight line VL, of the combustion-resistant portion 620, is smaller than an area of the opening of a second end surface 620b, which is the other end surface. The first end surface 620a is disposed closer to the starting end surface 100a, and the second end surface 620b is disposed closer to the terminating end surface 100b.

The readily combustible exposed surface 611 of the readily combustible portion 610 is exposed to the flow channel CA from a position of the first end surface 620a to a position of the second end surface 620b in the length direction parallel to the imaginary straight line VL. That is, in the initial state, all regions of the inner surface of the flow channel CA are constituted by the readily combustible exposed surface 611.

The combustion-resistant portion 620 covers the outer peripheral surface serving as the outer surface of the readily combustible portion 610, from the position of the first end surface 620a to the position of the second end surface 620b. Here, the outer peripheral surface of the readily combustible portion 610 is the side opposite the readily combustible exposed surface 611 in the radial direction orthogonal to the imaginary straight line VL.

The inner circumferential surface 621 serving as the inner surface of the combustion-resistant portion 620 in each of the blocks BK is inclined so as to gradually approach the casing 820 as the inner circumferential surface 621 approaches the second end surface 620b in the length direction parallel to the imaginary straight line VL. Here, the inner circumferential surface 621 of the combustion resistant portion 620 is the side far from the casing 820 in the radial direction orthogonal to the imaginary straight line VL. That is, in each of the blocks BK, the thickness in the radial direction of the combustion-resistant portion 620 continuously decreases from the first end surface 620a toward the second end surface 620b.

Note that, the inner circumferential surface 621 of the combustion-resistant portion 620 is an example of an inner surface that becomes exposed to the flow channel CA after the readily combustible portion 110 has burned out. The inner circumferential surface 621 protects the casing 820 while combusting slower than the readily combustible portion 110 after the readily combustible portion 110 has burned out.

The first end surface 620a of the combustion-resistant portion 620 in the terminating end side block BK contacts the end surface closer to the terminating end surface 100b of the readily combustible portion 610 of the starting end side block BK. Thus, the portion constituting the first end surface 620a of the combustion-resistant portion 620 of the terminating end side block BK constitutes a stopper for the readily combustible portion 610 of the starting end side block BK. Accordingly, the readily combustible portion 610 is unlikely to peel from the combustion-resistant portion 620 in the process of combustion.

Figure 9:
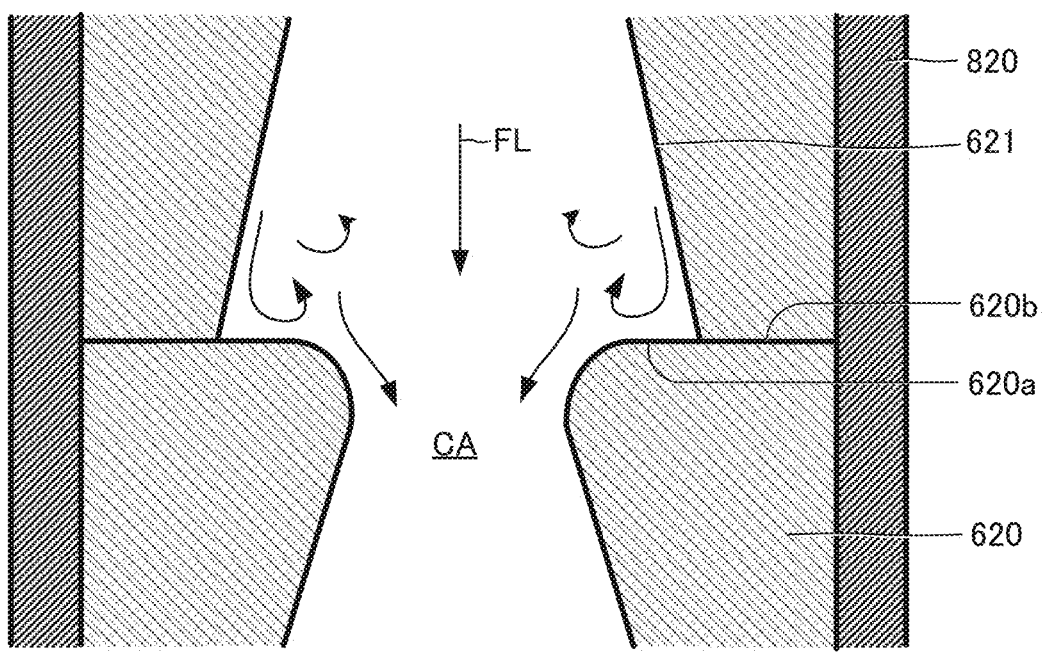
FIG. 9 is a conceptual drawing illustrating the state of the solid fuel according to Embodiment 6, after a readily combustible portion has burned out.

As illustrated in FIG. 9, after the readily combustible portion 610 has burned out, the inner circumferential surface 621 of the combustion-resistant portion 620 constitutes a spreading portion that has a cross-sectional area, perpendicular to the imaginary straight line VL of the flow channel CA, that gradually increases with proximity to the second end surface 620b. Additionally, in the combustion-resistant portion 620, the portion constituting the first end surface 620a assumes a state protruding into the flow channel CA.

As such, the portion constituting this first end surface 620a disrupts the flow of the fluid FL including the four components of the liquid oxidizer, the pyrolysis gas produced by pyrolyzing the combustion-resistant portion 620, the combustion gas obtained as a result of the pyrolysis gas combusting, and the flames. Due to this, the four components are mixed, thereby promoting the pyrolysis of the combustion-resistant portion 620. The promotion of the pyrolysis of the combustion-resistant portion 620 contributes to improvements in the thrust provided to the hybrid rocket 800.

Thus, in the combustion-resistant portion 620, the portion constituting the first end surface 620a not only fulfills a role as the stopper that prevents peeling of the readily combustible portion 610 in the initial stage after the start of combustion, but also fulfills a role of promoting the combustion of the combustion-resistant portion 620 itself in the stage after the readily combustible portion 610 has burned out.

Additionally, the portion constituting the first end surface 620a of the combustion-resistant portion 620 is less likely to completely combust than the thick portion 120 illustrated in FIG. 3. As such, the effect of promoting the combustion of the combustion-resistant portion 620 itself is easy to maintain.

This is thought to be due to local, excessive wear of the portion constituting the first end surface 620a being suppressed as a result of the flow rate of the fluid FL being appropriately decelerated, due to the inner circumferential surface 621 of the combustion-resistant portion 620 constituting the spreading portion that gradually increases the cross-section area of the flow channel CA, by the time the fluid FL contacts the first end surface 620a.

Additionally, one reason that the portion constituting the first end surface 620a is likely to remain is thought to be because the flow of the fluid FL along the inner circumferential surface 621 of the combustion-resistant portion 620 has a velocity component outward in the radial direction away from the imaginary straight line VL and, due to this, the inner circumferential surface 621 of the combustion-resistant portion 620 is unlikely to become a flat surface parallel to the imaginary straight line VL.

Embodiment 7

In Embodiment 6 described above, the solid fuel 600 is divided into a plurality of blocks BK. However, a configuration is possible in which the solid fuel 600 is not necessarily divided into the plurality of blocks BK. Hereinafter, a specific example of such a case is described.

Figure 10:
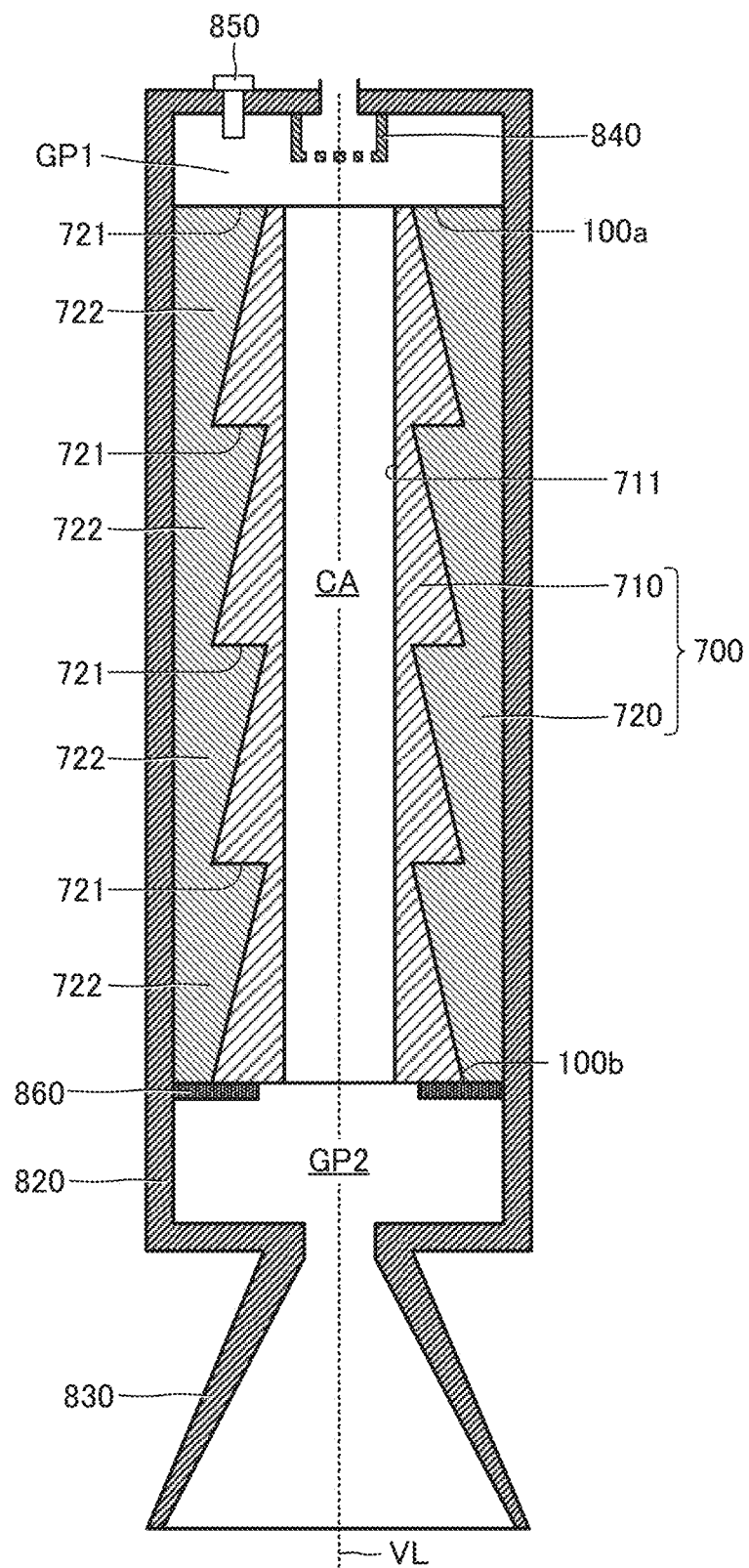
FIG. 10 is a cross-sectional view illustrating the configuration of a solid fuel according to Embodiment 7.

As illustrated in FIG. 10, a solid fuel 700 according to the present embodiment is constituted by joining a single readily combustible portion 710 and a single combustion-resistant portion 720. Each of the readily combustible portion 710 and the combustion-resistant portion 720 extends from the starting end surface 100a to the terminating end surface 100b.

The combustion-resistant portion 720 includes a step 721 protruding in a direction away from the casing 820 in the radial direction orthogonal to the imaginary straight line VL, and a spreading portion 722 that is inclined in a direction that gradually approaches the casing 820 as the spreading portion 722 approaches the terminating end surface 100b from the step 721.

Specifically, the combustion-resistant portion 720 includes, in the length direction, a plurality of sets of the step 721 and the spreading portion 722, specifically, four sets. The step 721 of the topmost block BK facing the gap GP1 constitutes the starting end surface 100a.

Note that, in the present embodiment, the thickness inward the radial direction of the readily combustible portion 710 is greater than that of each step 721 of the combustion-resistant portion 720. In the initial state prior to combustion of the solid fuel 700, all regions of the inner surface of the flow channel CA are constituted by the readily combustible exposed surface 711 of the readily combustible portion 710.

Additionally, in the present embodiment, three steps 721 of the four steps 721, with the exception of the step 721 constituting the starting end surface 100a, bite into the readily combustible portion 710, and fulfill a role as a stopper that prevents peeling of the readily combustible portion 710.

Additionally, similar to the portion constituting the second end surface 620a illustrated in FIG. 8 of the combustion-resistant portion 620 according to Embodiment 6 described above, these steps 721 also fulfill a role of promoting the combustion of the combustion-resistant portion 720 itself in the stage after the readily combustible portion 710 has burned out.

Embodiments 1 to 7 are described above, but these embodiments do not limit the present disclosure. For example, the following modifications are possible.

In Embodiment 1 described above, paraffin is used as the material of the readily combustible portion 110, and acrylic resin is used as the material of the combustion-resistant portion 140. However, provided that the combustion-resistant portion 140 is more resistant to combustion than the readily combustible portion 110, the materials of the readily combustible portion 110 and the combustion-resistant portion 140 are not particularly limited. When using paraffin as the material of the readily combustible portion 110, polyethylene resin or ABS resin can be used as the material of the combustion-resistant portion 140. This is applicable to the other embodiments as well.

In Embodiment 1 described above, an example is described of a case in which the solid fuel 100 is constituted by the readily combustible portion 110 and the combustion-resistant portion 140. However, a configuration is possible in which the solid fuel 100 includes a portion other than the readily combustible portion 110 and the combustion-resistant portion 140. Specifically, the solid fuel 100 may include a third material that has a combustion resistance different than that of the readily combustible portion 110 and the combustion-resistant portion 140. This is applicable to the other embodiments as well.

In Embodiment 1 described above, an example is described of a configuration in which the solid fuel 100 is applied to the hybrid rocket 800. However, the solid fuel 100 can be applied to a solid fuel rocket and other rockets other than the hybrid rocket 800. This is applicable to the other embodiments as well.

In Embodiments 1 to 4, and 6 described above, an example is described of a configuration in which a plurality of blocks BK having the same shape are combined. However, a configuration is possible in which blocks BK having different shapes are combined. For example, the block BK illustrated in FIG. 1 and the block BK illustrated in FIG. 8 may be combined.

In Embodiments 1 to 7 described above, an example is described of a case in which the inner surface of the flow channel CA constitutes the side surface of a cylindrical column having the imaginary straight line VL as the center axis. However, a configuration is possible in which the inner surface of the flow channel CA constitutes the side surface of a column having the imaginary straight line VL as the center axis other than a cylindrical column such as, for example, a prismatic column.

In Embodiment 5 described above, an example is described of a configuration in which, as illustrated in FIG. 7, the thick portion 522 serving as the stopper extends in the circumferential direction around the imaginary straight line VL, around the entire circumference. However, it is possible for the thick portion 522 to fulfill the role as the stopper without necessarily extending in the circumferential direction around the entire circumference. The same is applicable to the step 721 illustrated in FIG. 10. Even in a case in which the combustion-resistant portion 520 includes a protrusion that protrudes in a rod-like manner inward in the radial direction so as to approach an imaginary center axis VL, that protrusion bites into the readily combustible portion 510 and, as such, can fulfill the role as the stopper.

Hereinafter, a cryogenic liquid supply device is described that can be used as a specific example of the liquid oxidizer supply device 810 illustrated in FIG. 1.

Comparative Embodiment

Firstly, a cryogenic liquid supply device according to a comparative embodiment is described in order to demonstrate the problem to be solved by the cryogenic liquid supply device according to the embodiment.

Figure 16:
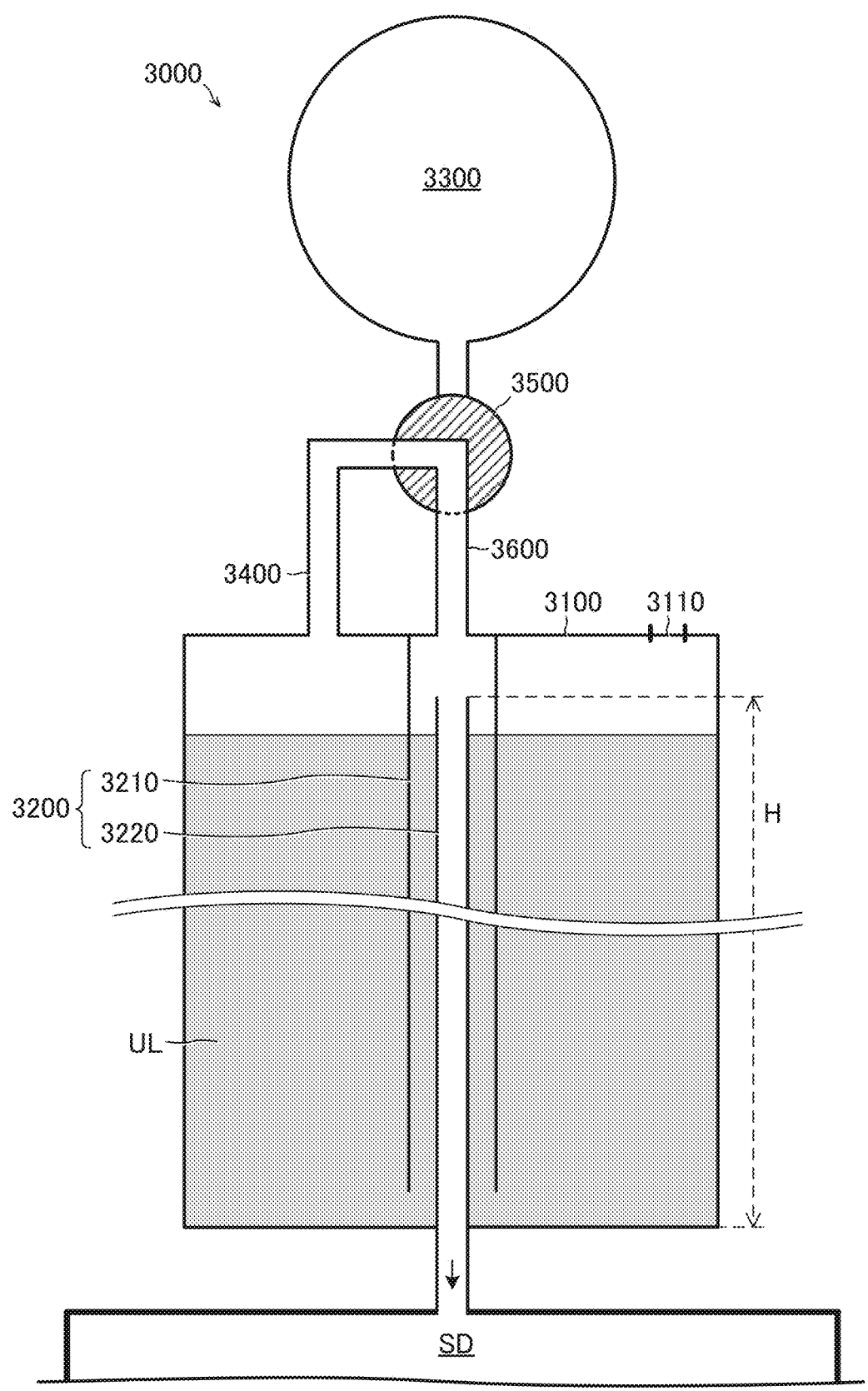
FIG. 16 is a conceptual drawing illustrating a cryogenic liquid supply device according to a comparative example, in a pressurization stop state.

As illustrated in FIG. 16, a cryogenic liquid supply device 3000 according to the comparative embodiment includes a tank 3100 that is liquid-tight and airtight. A cryogenic liquid UL is stored in the interior of the tank 3100. An inlet 3110 for injecting the cryogenic liquid UL into the tank 3100 is formed in a top surface of the tank 3100. The inlet 3110 is closed in an airtight and liquid-tight manner after the injecting of the cryogenic liquid UL is completed.

The cryogenic liquid supply device 3000 includes a supply pipe 3200 that guides the cryogenic liquid UL in the interior of the tank 3100 to a supply destination SD disposed downward from the tank 3100. The supply pipe 3200 has a double pipe structure constituted by an outer pipe 3210 and an inner pipe 3220 that passes through the interior of the outer pipe 3210.

The outer pipe 3210 extends from a top surface of the interior of the tank 3100 downward toward a bottom surface of the interior of the tank. An upper end of the inner pipe 3220 is open at a position facing the top surface of the tank 3100. A lower end of the inner pipe 3220 is connected to the supply destination SD.

The cryogenic liquid supply device 3000 includes a gas introduction/discharge pipe 3400 that has a first end that communicates with the interior of the tank 3100, a three-way valve 3500 that is connected to a second end of the gas introduction/discharge pipe 3400, and a gas guide pipe 3600 that has a first end that is connected to the three-way valve 3500 and a second end that communicates with the interior of the tank 3100.

The first end of the gas introduction/discharge pipe 3400 communicates with a region outside the outer pipe 3210 in the interior of the tank 3100. The second end of the gas guide pipe 3600 communicates with a region inside the outer pipe 3210 in the interior of the tank 3100.

The cryogenic liquid supply device 3000 includes a pressurization gas source 3300 that supplies a pressurization gas for pushing the cryogenic liquid UL in the tank 3100 through the supply pipe 3200 toward the supply destination SD. The pressurization gas source 3300 is also connected to the three-way valve 3500.

Firstly, the three-way valve 3500 is set to a pressurization stop state in which the supply of the pressurization gas from the pressurization gas source 3300 is cut off, and the gas introduction/discharge pipe 3400 and the gas guide pipe 3600 communicate with each other. In this state, the cryogenic liquid UL is injected into the tank 3100 via the inlet 3110. Due to the injection of the cryogenic liquid UL, the air in the tank 3100 is pushed out to the supply destination SD through the gas introduction/discharge pipe 3400, the gas guide pipe 3600, and the inner pipe 3220.

At this time, since, in the interior of the tank 3100, the outside of the outer pipe 3210 and the inside of the outer pipe 3210 are in communication via the gas introduction/discharge pipe 3400 and the gas guide pipe 3600, the height of the liquid surface of the cryogenic liquid UL is the same on the outside of the outer pipe 3210 and the inside of the outer pipe 3210 in the interior of the tank 3100.

Next, the three-way valve 3500 is switched to a pressurization state in which the first end of the gas guide pipe 3600 is closed, and the pressurization gas source 3300 and the gas introduction/discharge pipe 3400 communicate with each other. As a result, the liquid surface of the cryogenic liquid UL on the outside of the outer pipe 3210 is pressurized by the pressurization gas supplied from the pressurization gas source 3300, through the gas introduction/discharge pipe 3400, and into the interior of the tank 3100.

Thus, the liquid surface of the cryogenic liquid UL on the outside of the outer pipe 3210 falls, the liquid surface of the cryogenic liquid UL on the inside of the outer pipe 3210 rises, and the cryogenic liquid UL flows into the inner pipe 3220. The cryogenic liquid UL that has flowed in is supplied through the inner pipe 3220 to the supply destination SD.

In the cryogenic liquid supply device 3000 described above, when injecting the cryogenic liquid UL into the tank 3100 in the pressurization stop state, it is necessary to pay close attention so that the liquid surface of the cryogenic liquid UL does not exceed a limit height H representing a distance from the bottom surface of the tank 3100 to the opening of the upper end of the inner pipe 3220.

This is because, if the liquid surface of the cryogenic liquid UL exceeds the limit height H, overflow will occur in which the cryogenic liquid UL flows into the inner pipe 3220 even though the pressurization gas is not being supplied, and the cryogenic liquid UL flows out to the supply destination SD through the inner pipe 3220.

Setting the liquid surface of the cryogenic liquid UL sufficiently lower than the limit height H is effective to prevent this problem. However, in such a case, the filling rate, which is the ratio of the entire volume of the tank 3100 occupied by the volume of the cryogenic liquid UL, will be low and, as such, it is difficult to say that the tank 3100 is being effectively utilized. Hereinafter, an embodiment that solves this problem is described.

Embodiment 8

Figure 11:
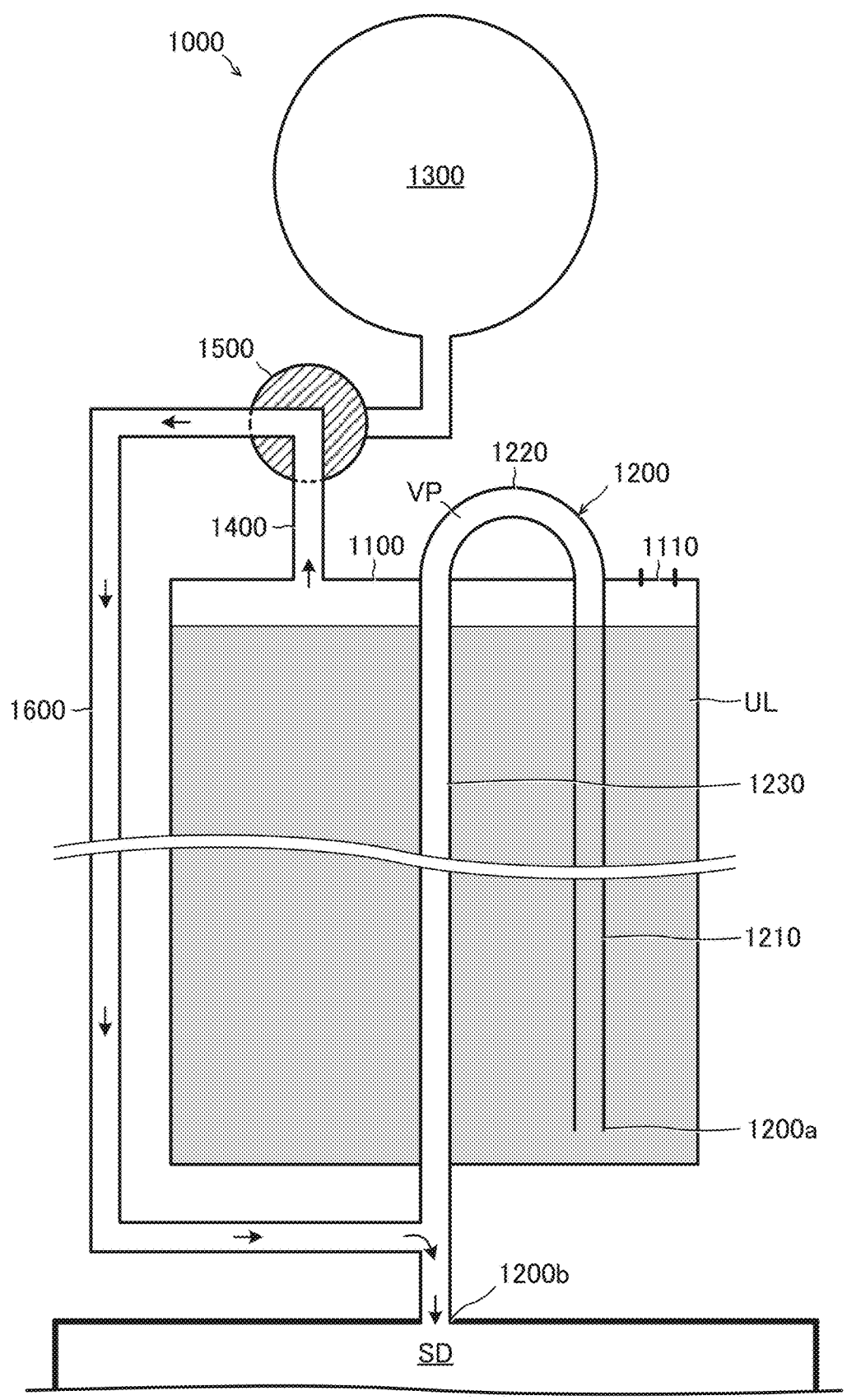
FIG. 11 is a conceptual drawing illustrating a cryogenic liquid supply device according to Embodiment 8, in a pressurization stop state.

As illustrated in FIG. 11, a cryogenic liquid supply device 1000 according to the present embodiment includes a tank 1100 that is liquid-tight and airtight. A cryogenic liquid UL is stored in the interior of the tank 1100. An inlet 1110 for injecting the cryogenic liquid UL in the interior of the tank 1100 is formed in a top surface of the tank 1100. The inlet 1110 is closed in an airtight and liquid-tight manner after the injecting of the cryogenic liquid UL into the tank 1100 is completed.

The cryogenic liquid supply device 1000 includes a supply pipe 1200 that guides the cryogenic liquid UL in the interior of the tank 1100 to a supply destination SD disposed downward from the tank 1100, and a pressurization gas source 1300 that supplies a pressurization gas for pushing the cryogenic liquid UL in the tank 1100 through the supply pipe 1200 toward the supply destination SD.

The supply pipe 1200 includes an inflow end 1200a through which the cryogenic liquid UL flows in, and an outflow end 1200b through which the cryogenic liquid UL flows out, and constitutes a pipe passage through which the cryogenic liquid UL flows from the inflow end 1200a to the outflow end 1200b. The inflow end 1200a is immersed in the cryogenic liquid UL in the tank 1100. The outflow end 1200b is connected to the supply destination SD.

The most significant feature of the supply pipe 1200 according to the present embodiment is that the supply pipe 1200 includes a turn-back 1220, serving as an upward protrusion protruding upward from the tank 1100, along the pipe passage through which the cryogenic liquid UL flows. The turn-back 1220 is provided between the inflow end 1200a and the outflow end 1200b.

Specifically, in addition to the turn-back 1220, the supply pipe 1200 includes an upward guide 1210 from the inflow end 1200a to the turn-back 1220, and a downward guide 1230 from the turn-back 1220 to the supply destination SD and, overall, forms an upside-down U shape.

A first end of the upward guide 1210 constitutes the inflow end 1200a. A second end of the upward guide 1210 is connected to the turn-back 1220. The upward guide 1210 guides the cryogenic liquid UL upward from the inflow end 1200a toward the turn-back 1220.

The turn-back 1220 turns the cryogenic liquid UL guided upward by the upward guide 1210 back toward the interior of the tank 1100. Thus, the turn-back 1220 constitutes a portion of the pipe passage through which the cryogenic liquid UL flows.

A first end of the downward guide 1230 is connected to the turn-back 1220. The downward guide 1230 penetrates the bottom surface of the tank 1100, and a second end of the downward guide 1230 constitutes the outflow end 1200b. The downward guide 1230 guides the cryogenic liquid UL, which is turned back downward at the turn-back 1220, downward toward the supply destination SD through the interior of the tank 1100.

Additionally, the cryogenic liquid supply device 1000 includes a gas introduction/discharge pipe 1400 that has a first end that communicates with the interior of the tank 1100, a three-way valve 1500 that serves as a gas valve and is connected to a second end of the gas introduction/discharge pipe 1400, and a gas guide pipe 1600 that has a first end that is connected to the three-way valve 1500. A second end of the gas guide pipe 1600 is connected to a portion of the downward guide 1230 of the supply pipe 1200 between the bottom surface of the tank 1100 and the supply destination SD.

The pressurization gas source 1300 is also connected to the three-way valve 1500. The three-way valve 1500 is capable of switching between a pressurization stop state in which the supply of the pressurization gas from the pressurization gas source 1300 to the tank 1100 is cut off, and the gas introduction/discharge pipe 1400 and the gas guide pipe 1600 communicate with each other, and a pressurization state in which the communication between the gas introduction/discharge pipe 1400 and the gas guide pipe 1600 is cut off, and the pressurization gas source 1300 and the gas introduction/discharge pipe 1400 communicate with each other.

FIG. 11 illustrates the cryogenic liquid supply device 1000 in the pressurization stop state. In the pressurization stop state, a user injects the cryogenic liquid UL into the tank 1100 through the inlet 1110. As a result of injecting the cryogenic liquid UL, the air in the tank 1100 is pushed out by the injected cryogenic liquid UL to the supply destination SD through the gas introduction/discharge pipe 1400, the gas guide pipe 1600, and the downward guide 1230.

As such, there is no need to form an air discharge hole in the tank 1100 to discharge the air that replaced the cryogenic liquid UL. However, an air discharge hole may be formed in the tank 1100, or a portion of the inlet 1110 may fulfill a role as an air discharge hole.

Additionally, at this time, since the interior of the tank 1100 and the interior of the supply pipe 1200 are in communication via the gas introduction/discharge pipe 1400 and the gas guide pipe 1600, the air pressure in the interior of the tank 1100 and the air pressure in the interior of the supply pipe 1200 are equal. Accordingly, the height of the liquid surface of the cryogenic liquid UL in the interior of the tank 1100 and the height of the liquid level of the cryogenic liquid UL in the upward guide 1210 are made equal.

Note that, in the present embodiment, the air pressure of the supply destination SD is equal to atmospheric pressure and, in the pressurization stop state, the interior of the tank 1100 and the interior of the supply pipe 1200 are maintained at atmospheric pressure.

Moreover, since the turn-back 1220 protrudes upward from the tank 1100, when the cryogenic liquid UL is injected into the tank 1100, a void VP is secured at least from the turn-back 1220 to the outflow end 1200b of the pipe passage constituted by the supply pipe 1200.

Accordingly, the problem of overflowing in which the cryogenic liquid UL flows out to the supply destination SD through the supply pipe 1200 when the cryogenic liquid UL is injected into the tank 1100 can be avoided. Due to this, the work of injecting the cryogenic liquid UL into the tank 1100 can be easily performed.

Additionally, the problem of overflowing can be avoided even when the liquid surface of the cryogenic liquid UL in the interior of the tank 1100 is set higher than conventional. Specifically, the height of the cryogenic liquid UL in the tank 1100 can be set higher than the limit height H illustrated in FIG. 16. Due to this, the filling rate of the cryogenic liquid UL in the tank 1100 can be improved compared to conventional cases.

Note that the inlet 1110 is closed in an airtight and liquid-tight manner upon completion of the injection of the cryogenic liquid UL into the tank 1100. In this state, gas obtained as a result of the cryogenic liquid UL vaporizing in the tank 1100 is discharged out of the tank 1100 through the gas introduction/discharge pipe 1400. That is, the gas introduction/discharge pipe 1400 fulfills a role as a gas discharger that discharges gas, obtained as a result of the cryogenic liquid UL vaporizing in the tank 1100, out of the tank 1100.

The gas discharged through the gas introduction/discharge pipe 1400 is guided through the gas guide pipe 1600 to the supply destination SD. Specifically, the gas discharged from the gas introduction/discharge pipe 1400 is supplied to the supply destination SD through the gas guide pipe 1600, and the void VP in the downward guide 1230 of the supply pipe 1200. Due to this, pressure increases in the tank 1100 while in the pressurization stop state are suppressed.

Moreover, the three-way valve 1500 can be switched to the pressurization state at a timing at which the cryogenic liquid UL is to be supplied to the supply destination SD. Hereinafter, the operations of the cryogenic liquid supply device 1000 in the pressurization state are described.

Figure 12:
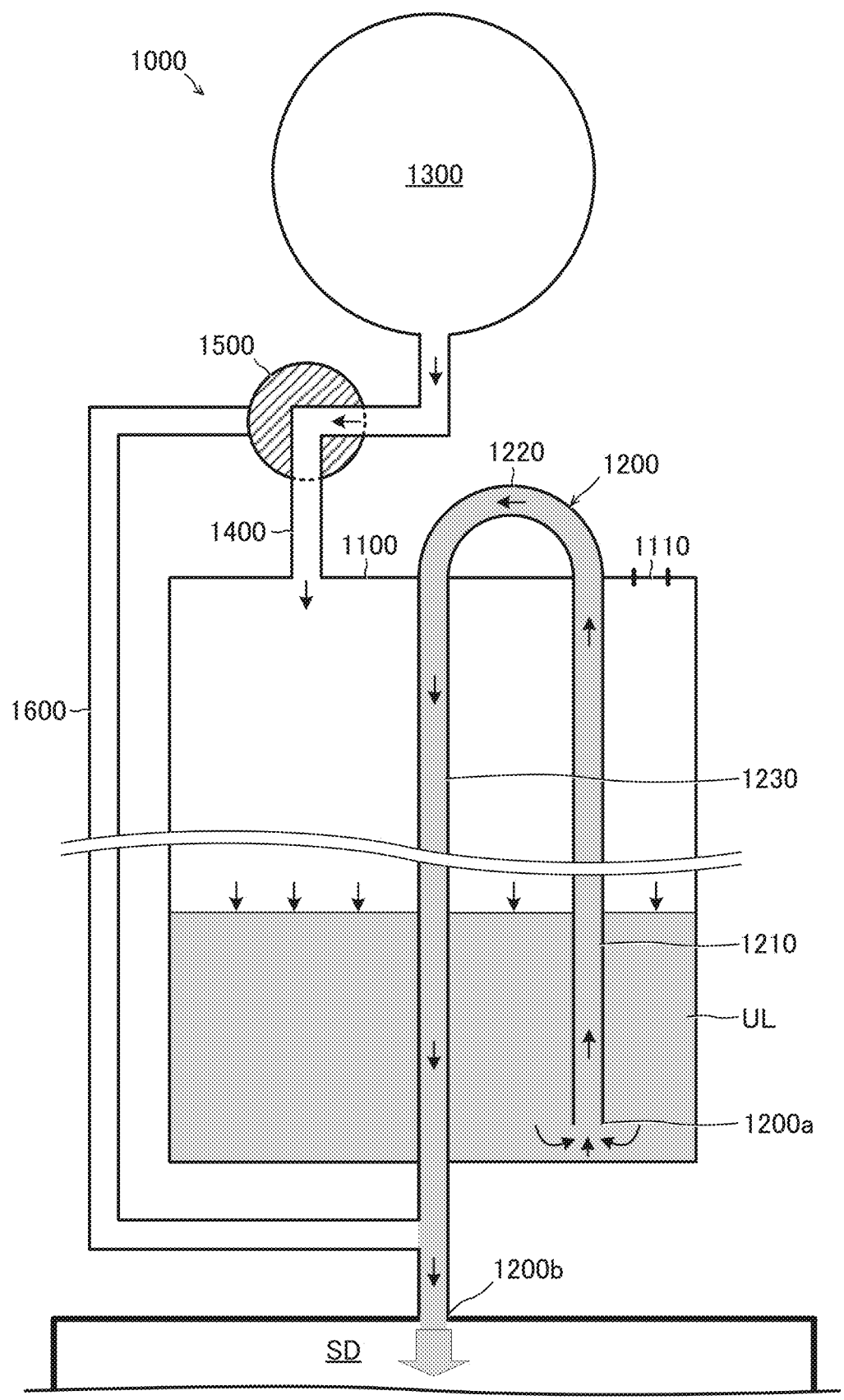
FIG. 12 is a conceptual drawing illustrating the cryogenic liquid supply device according to Embodiment 8, in a pressurization state.

As illustrated in FIG. 12, when the three-way valve 1500 is switched to the pressurization state, the communication between the gas introduction/discharge pipe 1400 and the gas guide pipe 1600 is cut off and, as such, discharging of the gas, obtained as a result of the cryogenic liquid UL vaporizing, through the gas introduction/discharge pipe 1400 is cut off.

Moreover, the pressurization gas source 1300 and the gas introduction/discharge pipe 1400 are in communication with each other and, as such, the pressurization gas is supplied from the pressurization gas source 1300, through the gas introduction/discharge pipe 1400, to the tank 1100. Thus, the gas introduction/discharge pipe 1400 fulfills a role of guiding the pressurization gas to the tank 1100.

As a result, the liquid surface of the cryogenic liquid UL in the tank 1100 is pressed downward by the pressurization gas. Due to this, the cryogenic liquid UL flows through the inflow end 1200a into the upward guide 1210.

The cryogenic liquid UL that has flowed into the upward guide 1210 rises toward the turn-back 1220, turns back at the turn-back 1220, and falls through the outflow end 1200b toward the supply destination SD. Thus, the cryogenic liquid UL is pushed through from the inflow end 1200a to the outflow end 1200b toward the supply destination SD by the pressurization gas.

The downward guide 1230 passes through the interior of the tank 1100, and the cryogenic liquid UL that is turned back downward at the turn-back 1220 is supplied through the interior of the tank 1100 to the supply destination SD. As such, compared to a case in which the downward guide 1230 is disposed outside the tank 1100, the cryogenic liquid UL flowing through the downward guide 1230 is less likely to be heated by outside air.

Embodiment 9

In Embodiment 8 described above, a supply pipe 1200 having an upside-down U shape is used, but the shape is not particularly limited so long as the supply pipe 1200 first guides the cryogenic liquid UL upward from the tank 1100 and, then, turns the cryogenic liquid UL back downward at a position upward from the tank 1100. Hereinafter, a specific example is described in which the shape of the supply pipe 1200 is changed.

Figure 13:
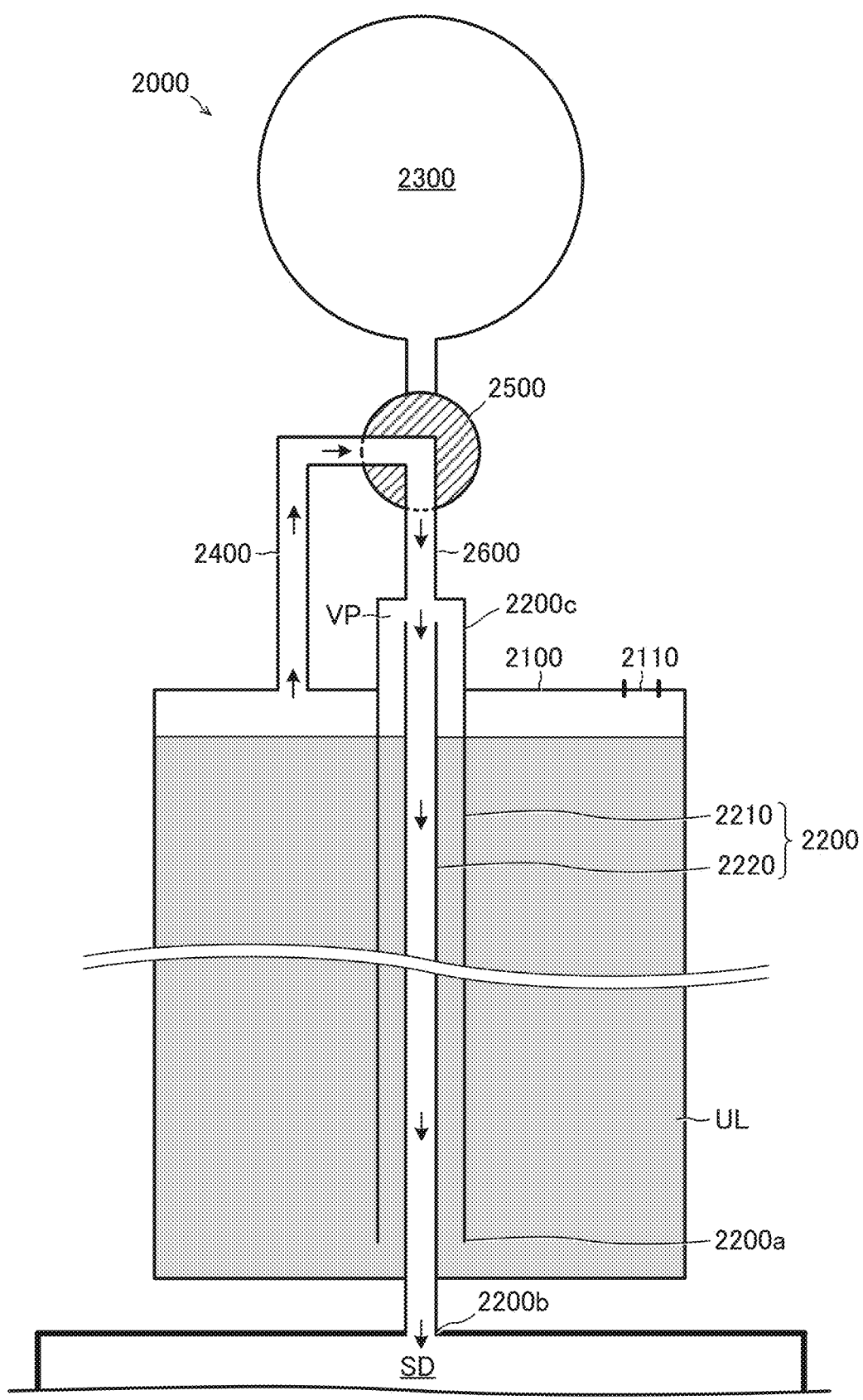
FIG. 13 is a conceptual drawing illustrating a cryogenic liquid supply device according to Embodiment 9, in a pressurization stop state.

As illustrated in FIG. 13, a cryogenic liquid supply device 2000 according to the present embodiment includes a tank 2100 that is liquid-tight and airtight, a cryogenic liquid UL being stored in the interior of the tank 2100, a supply pipe 2200 that guides the cryogenic liquid UL in the tank 2100 to a supply destination SD disposed downward from the tank 2100, and a pressurization gas source 2300 that supplies a pressurization gas for pushing the cryogenic liquid UL in the interior of the tank 2100 through the supply pipe 2200 toward the supply destination SD.

The supply pipe 2200 includes an inflow end 2200a through which the cryogenic liquid UL flows in, and an outflow end 2200b through which the cryogenic liquid UL flows out, and constitutes a pipe passage through which the cryogenic liquid UL flows from the inflow end 2200a to the outflow end 2200b. The inflow end 2200a is immersed in the cryogenic liquid UL in the interior of the tank 2100. The outflow end 2200b is connected to the supply destination SD.

The most significant feature of the supply pipe 2200 according to the present embodiment is that an upward protrusion 2200c protruding upward from the tank 2100 is provided along the pipe passage through which the cryogenic liquid UL flows. The upward protrusion 2200c is provided between the inflow end 2200a and the outflow end 2200b.

Specifically, the supply pipe 2200 includes a straight pipe-shaped outer pipe 2210, and a straight pipe-shaped inner pipe 2220 that passes through the interior of the outer pipe 2210 and that penetrates the tank 2100.

A first end of the outer pipe 2210 constitutes the inflow end 2200a. A second end of the outer pipe 2210 constitutes the upward protrusion 2200c. A first end of the inner pipe 2220 is open to the interior of the upward protrusion 2200c. A second end of the inner pipe 2220 constitutes the outflow end 2200b.

The cryogenic liquid UL is guided upward from the inflow end 2200a toward the upward protrusion 2200c by the inner surface of the outer pipe 2210 and the outer surface of the inner pipe 2220. Moreover, in the upward protrusion 2200c, the cryogenic liquid UL flows into the opening of the first end of the inner pipe 2220, and the cryogenic liquid UL that has flowed in is guided to the supply destination SD by the inner pipe 2220.

Additionally, the cryogenic liquid supply device 2000 includes a gas introduction/discharge pipe 2400 that has a first end that communicates with the interior of the tank 2100, a three-way valve 2500 that serves as a gas valve and is connected to a second end of the gas introduction/discharge pipe 2400, and a gas guide pipe 2600 that has a first end that is connected to the three-way valve 2500.

The first end of the gas introduction/discharge pipe 2400 communicates with a region outside the outer pipe 2210 in the interior of the tank 2100. The second end of the gas guide pipe 2600 communicates with a region inside the outer pipe 2210 in the interior of the tank 2100, specifically, with the interior of the upward protrusion 2200c.

The pressurization gas source 2300 is also connected to the three-way valve 2500. The three-way valve 2500 is capable of switching between a pressurization stop state in which the supply of the pressurization gas from the pressurization gas source 2300 to the tank 2100 is cut off, and the gas introduction/discharge pipe 2400 and the gas guide pipe 2600 communicate with each other, and a pressurization state in which the communication between the gas introduction/discharge pipe 2400 and the gas guide pipe 2600 is cut off, and the pressurization gas source 2300 and the gas introduction/discharge pipe 2400 communicate with each other.

FIG. 13 illustrates the cryogenic liquid supply device 2000 in the pressurization stop state. In the pressurization stop state, a user injects, through the inlet 2110, the cryogenic liquid UL into the region outside the outer pipe 2210 in the tank 2100. In this process, the air in the tank 2100 is pushed out by the injected cryogenic liquid UL to the supply destination SD through the gas introduction/discharge pipe 2400, the gas guide pipe 2600, and the inner pipe 2220.

Additionally, at this time, since the region inside and the region outside the outer pipe 2210 in the tank 2100 are in communication with each other via the gas introduction/discharge pipe 2400 and the gas guide pipe 2600, the air pressures inside and outside the outer pipe 2210 in the interior of the tank 2100 are equal. Accordingly, the heights of the liquid surface of the cryogenic liquid UL inside and outside the outer pipe 2210 in the interior of the tank 2100 are equal.

Note that, in the present embodiment, the air pressure of the supply destination SD is equal to atmospheric pressure and, in the pressurization stop state, the inside and the outside of the outer pipe 2210 in the interior of the tank 2100 are maintained at atmospheric pressure.

Moreover, since the upward protrusion 2200c protrudes upward from the tank 2100, when the cryogenic liquid UL is injected into the tank 2100, a void VP is secured from at least the upward protrusion 2200c to the outflow end 2200b of the pipe passage through which the cryogenic liquid UL flows and that is constituted by the supply pipe 2200.

Accordingly, the problem of overflowing in which the cryogenic liquid UL flows out to the supply destination SD through the inner pipe 2220 when the cryogenic liquid UL is injected into the tank 2100 can be avoided. Due to this, the work of injecting the cryogenic liquid UL into the tank 2100 can be easily performed.

Additionally, the problem of overflowing can be avoided even when the liquid surface of the cryogenic liquid UL in the interior of the tank 2100 is set higher than conventional. Specifically, the height of the cryogenic liquid UL in the interior of the tank 2100 can be set higher than the limit height H illustrated in FIG. 16. As such, the filling rate of the cryogenic liquid UL in the tank 2100 can be improved compared to conventional cases.

Note that the inlet 2110 is closed in an airtight and liquid-tight manner upon the completion of the injection of the cryogenic liquid UL into the tank 2100. In this state, gas obtained as a result of the cryogenic liquid UL vaporizing in the interior of the tank 2100 is discharged out of the tank 2100 through the gas introduction/discharge pipe 2400. That is, the gas introduction/discharge pipe 2400 fulfills a role as a gas discharger that discharges gas, obtained as a result of the cryogenic liquid UL vaporizing in the interior of the tank 2100, out of the tank 2100.

The gas discharged from the gas introduction/discharge pipe 2400 is guided to the supply destination SD through the gas guide pipe 2600, the upward protrusion 2220c, and the void VP of the inner pipe 2220. Due to this, pressure increases in the tank 2100 while in the pressurization stop state are suppressed.

Moreover, the three-way valve 2500 can be switched to the pressurization state at a timing at which the cryogenic liquid UL is to be supplied to the supply destination SD. Hereinafter, the operations of the cryogenic liquid supply device 2000 in the pressurization state are described.

Figure 14:
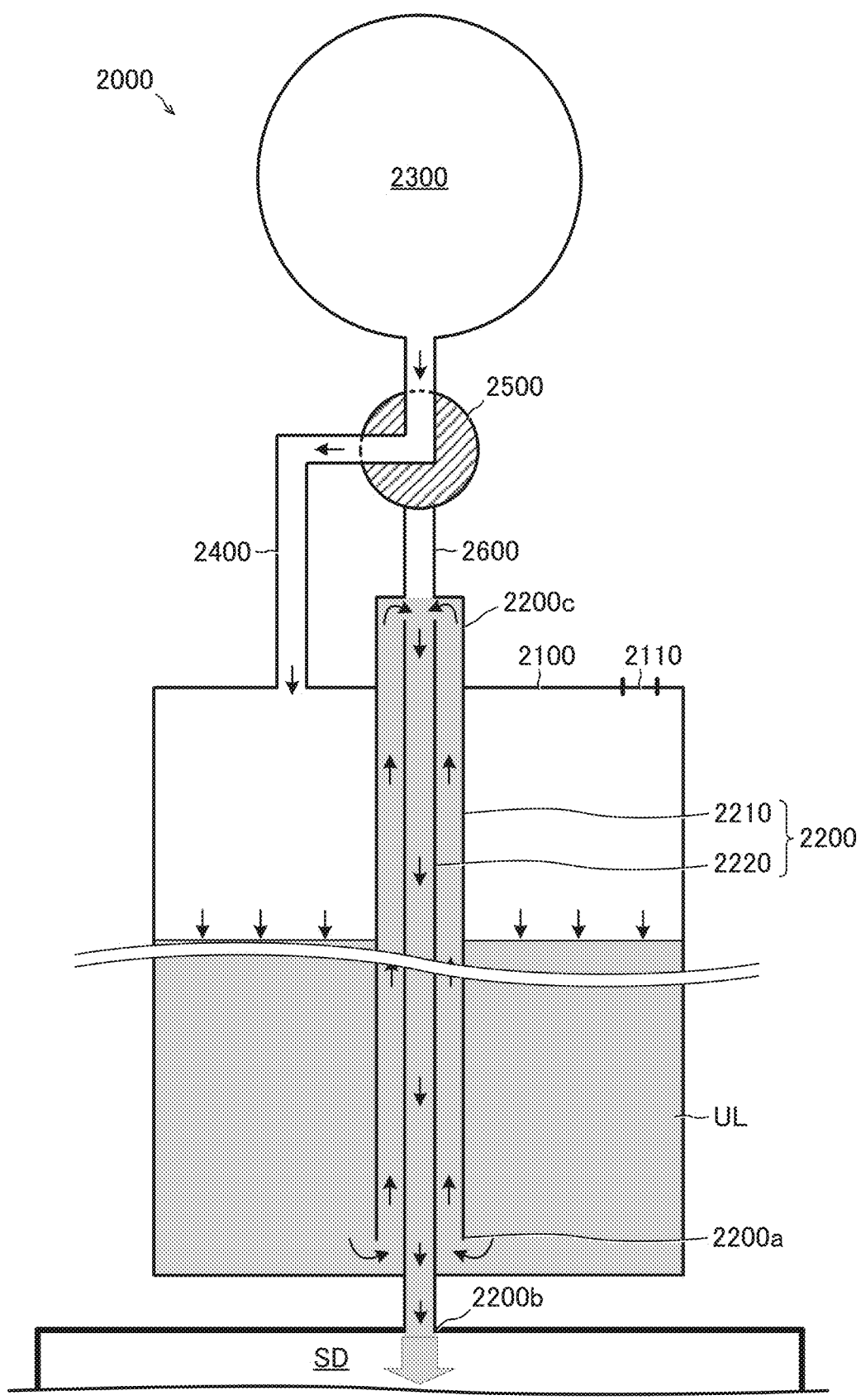
FIG. 14 is a conceptual drawing illustrating the cryogenic liquid supply device according to Embodiment 9, in a pressurization state.

As illustrated in FIG. 14, when the three-way valve 2500 is switched to the pressurization state, the communication between the gas introduction/discharge pipe 2400 and the gas guide pipe 2600 is cut off and, as such, discharging of the gas, obtained as a result of the cryogenic liquid UL vaporizing, through the gas introduction/discharge pipe 2400 is cut off.

Moreover, the pressurization gas source 2300 and the gas introduction/discharge pipe 2400 are in communication with each other and, as such, the pressurization gas is supplied from the pressurization gas source 2300, through the gas introduction/discharge pipe 2400, to the tank 2100. Thus, the gas introduction/discharge pipe 2400 fulfills a role of guiding the pressurization gas to the tank 2100. As a result, the liquid surface of the cryogenic liquid UL in the tank 2100 is pressed downward by the pressurization gas.

Due this, the cryogenic liquid UL flows in through the inflow end 2200a between the outer pipe 2210 and the inner pipe 2220. The cryogenic liquid UL that has flowed in rises toward the upward protrusion 2200c, is turned back at the upward protrusion 2200c, and falls through the inner pipe 2220 toward the supply destination SD. Thus, the cryogenic liquid UL is pushed through from the inflow end 2200a to the outflow end 2200b toward the supply destination SD by the pressurization gas.

Embodiment 10

Although applications of the cryogenic liquid supply devices 1000 and 2000 according to Embodiments 8 and 9 are not limited, the cryogenic liquid supply devices 1000 and 2000 are particularly suitable for applications of supplying a liquid oxidizer serving as a cryogenic liquid UL in a hybrid rocket. Hereinafter, a specific example is described in which the cryogenic liquid supply device 1000 according to Embodiment 8 is applied to a hybrid rocket.

Figure 15:
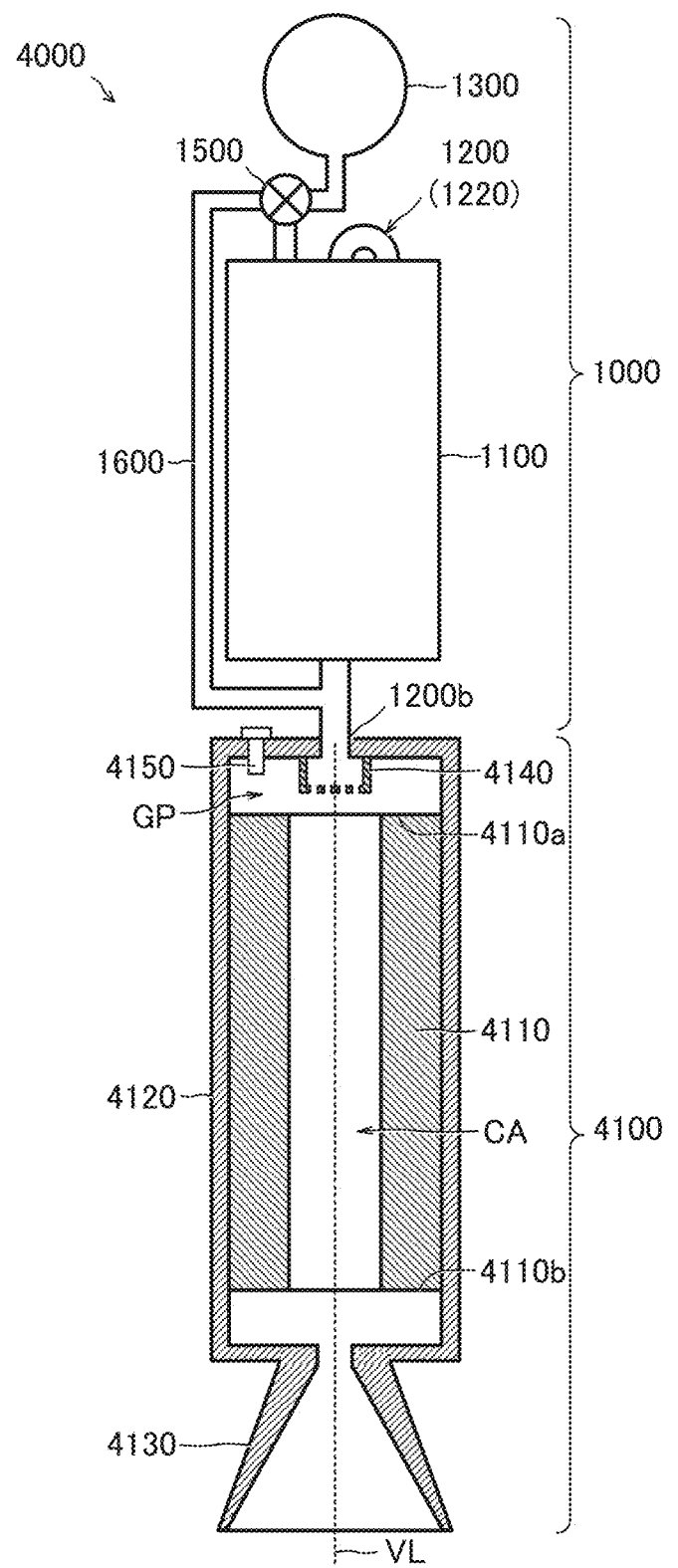
FIG. 15 is a conceptual drawing illustrating the configuration of a hybrid rocket according to Embodiment 10.

As illustrated in FIG. 15, a hybrid rocket 4000 according to the present embodiment includes a combustor 4100 including a solid fuel 4110, and a cryogenic liquid supply device 1000 that supplies liquid oxygen serving as a cryogenic liquid UL to the solid fuel 4110.

In addition to the solid fuel 4110, the combustor 4100 includes a casing 4120 that houses the solid fuel 4110, and a nozzle 4130 connected to the casing 4120.

The casing 4120 is formed in a hollow cylinder shape having the imaginary straight line VL, parallel to the direction in which the hybrid rocket 4000 is propelled, as the center axis. A first end of the casing 4120 in the extending direction of the imaginary straight line VL is connected to the outflow end 1200b of the cryogenic liquid supply device 1000. The nozzle 4130 is connected to a second end of the casing 4120.

In the casing 4120, the solid fuel 4110 defines a flow channel CA that is a hollow section extending along the imaginary straight line VL. This flow channel CA corresponds to the supply destination SD illustrated in FIG. 11. Both end surfaces of the solid fuel 4110 in the extending direction of the imaginary straight line VL are open. An opening of a starting end surface 4110a that is a first end of the solid fuel 4110 and an opening of a terminating end surface 4110b that is a second end of the solid fuel 4110 are in communication with each other via the flow channel CA.

A gap GP is secured between an inner wall of the first end connected to the cryogenic liquid supply device 1000 of the casing 4120, and the starting end surface 4110a of the solid fuel 4110. The combustor 4100 includes an atomizer 4140 disposed in the gap GP, and an igniter 4150 disposed so as to face the gap GP.

The atomizer 4140 atomizes the liquid oxygen supplied by the cryogenic liquid supply device 1000. The atomized liquid oxygen flows into the flow channel CA through the opening of the starting end surface 4110a of the solid fuel 4110. That is, the cryogenic liquid supply device 1000 supplies the liquid oxygen through the atomizer 4140 to the flow channel CA of the solid fuel 4110.

Hereinafter, the operations of the hybrid rocket 4000 are described. Firstly, the igniter 4150 produces high-temperature fuel gas. The fuel gas produced by the igniter 4150 flows into the flow channel CA, and the solid fuel 4110 assumes a partially pyrolyzed state.

In this state, the cryogenic liquid supply device 1000 starts to supply the liquid oxygen. The liquid oxygen supplied by the cryogenic liquid supply device 1000 is atomized in the atomizer 4140, and flows into the flow channel CA. The atomized liquid oxygen reaches the vicinity of the inner wall surface of the flow channel CA and, as a result, the fuel gas combusts. Due to this, the pyrolization of the inner surface of the solid fuel 4110 facing the flow channel CA is promoted, and flames and combustion gas are produced.

The combustion gas and the flames flow in the flow channel CA from the opening of the starting end surface 4110a toward the opening of the terminating end surface 4110b. In this process, the flames and the combustion gas cause the surface layer portion of the un-combusted solid fuel 4110 to pyrolyze and produce combustion gas, and that combustion gas then combusts.

Thus, the solid fuel 4110 combusts in a mode in which a flow of combustion gas, flowing from the starting end surface 4110a toward the terminating end surface 4110b, is produced in the flow channel CA. The combustion gas that flows out from the opening of the terminating end surface 4110b is accelerated to supersonic speed in the nozzle 4130, and jetted from the nozzle 4130. The hybrid rocket 4000 obtains thrust and is propelled by the reaction to this jetting.

Embodiments 8 to 10 are described above, but these embodiments do not limit the present disclosure. For example, the following modifications are possible.

In Embodiment 8 described above, as illustrated in FIG. 11, a configuration is used in which the first end of the gas guide pipe 1600 is connected to the three-way valve 1500 and the second end is connected to the downward guide 1230. However, it is not necessary that the second end of the gas guide pipe 1600 be connected to the downward guide 1230, and it is sufficient that the second end be connected to the portion of the supply pipe 1200 where the void VP is formed.

Applications of the cryogenic liquid supply devices 1000 and 2000 according to Embodiments 8 and 9 are not particularly limited to the hybrid rocket 4000. For example, the cryogenic liquid supply devices 1000 and 2000 according to Embodiments 8 and 9 can be used in any applications for supplying a cryogenic liquid UL such as liquid oxygen, liquid hydrogen, liquid nitrogen, liquid helium, or the like.

Embodiment 10 may be applied to any of Embodiments 1 to 7. Specifically, the solid fuel 100 illustrated in FIG. 2, the solid fuel 200 illustrated in FIG. 4, the solid fuel 300 illustrated in FIG. 5, the solid fuel 400 illustrated in FIG. 6, the solid fuel 500 illustrated in FIG. 7, the solid fuel 600 illustrated in FIG. 8, or the solid fuel 700 illustrated in FIG. 10 may be used as the solid fuel 4110 illustrated in FIG. 15.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2018-130158, filed on Jul. 9, 2018, and Japanese Patent Application No. 2018-132797, filed on Jul. 13, 2018, of which the entirety of the disclosures is incorporated by reference herein.

REFERENCE SIGNS LIST

100, 200, 300, 400, 500, 600, 700 Solid fuel
100a Starting end surface
100b Terminating end surface
110, 410, 510, 610, 710 Readily combustible portion
111, 411, 511, 611, 711 Readily combustible exposed surface
120, 522 Thick portion (stopper)
121 Combustion-resistant exposed surface
130, 440, 521 Thin portion
140, 450, 520, 620, 720 Combustion-resistant portion
140a, 450a, 620a First end surface
140b, 450b, 620b Second end surface
420 First thick portion
421 First combustion-resistant exposed surface
430 Second thick portion (stopper)
431 Second combustion-resistant exposed surface
621 Inner circumferential surface (inner surface)
721 Step
722 Spreading portion
800 Hybrid rocket (rocket)
810 Liquid oxidizer supply device
811 Tank
812 Pressurization gas source
813 Gas valve
814 Liquid valve
820 Casing
830 Nozzle
840 Atomizer
850 Igniter
860 Stopper
1000, 2000, 3000 Cryogenic liquid supply device (liquid oxidizer supply device)
1100, 2100, 3100 Tank
1110, 2110, 3110 Inlet
1200, 2200, 3200 Supply pipe
1200a, 2200a Inflow end
1200b, 2200b Outflow end
1210 Upward guide
1220 Turn-back (upward protrusion)
1230 Downward guide
1300, 2300, 3300 Pressurization gas source
1400, 2400 Gas introduction/discharge pipe (gas discharger)
1500, 2500 Three-way valve (gas valve)
1600, 2600 Gas guide pipe
2200c Upward protrusion
2210, 3210 Outer pipe
2220, 3220 Inner pipe
3400 Gas introduction/discharge pipe
3500 Three-way valve
3600 Gas guide pipe
4000 Hybrid rocket
4100 Combustor
4110 Solid fuel
4110a Starting end surface
4110b Terminating end surface
4120 Casing
4130 Nozzle
4140 Atomizer
4150 Igniter
AP Opening
BK Block
CA Flow channel (hollow portion, supply destination)
FL Fluid
GP Gap
GP1 Gap (front combustion chamber)
GP2 Gap (rear combustion chamber)
H Limit height
SD Supply destination
UL Cryogenic liquid (liquid oxidizer)
VL Imaginary straight line
VP Void

The invention claimed is:

1. A hybrid rocket comprising:
a solid fuel that includes a starting end surface that is one end surface in a length direction and a terminating end surface that is another end surface in the length direction and in which openings are formed on the starting end surface and the terminating end surface, the solid fuel defining therein a flow channel communicating between the opening of the starting end surface and the opening of the terminating end surface;
a liquid oxidizer supply device that supplies a liquid oxidizer that causes the solid fuel to oxidize to the flow channel through the opening of the starting end surface of the solid fuel, thereby causing the solid fuel to combust in a mode in which a flow of combustion gas, flowing in a direction from the starting end surface toward the terminating end surface, is produced in the flow channel;
a casing that houses the solid fuel; and a nozzle that is connected to an end of the casing and that jets the combustion gas, wherein the solid fuel includes a readily combustible portion including a readily combustible exposed surface exposed to the flow channel, and a combustion-resistant portion covering an outer surface, opposite to the readily combustible exposed surface in a direction orthogonal to the length direction, of the readily combustible portion, the combustion-resistant portion comprising a material that is more resistant to combustion than the readily combustible portion and including an inner surface that is exposed to the flow channel after the readily combustible portion burns out, thereby combusting slower than the readily combustible portion while protecting the casing, the combustion-resistant portion includes a stopper that prevents peeling of the readily combustible portion in the direction from the starting end surface toward the terminating end surface, the liquid oxidizer supply device includes a tank that has an interior in which the liquid oxidizer is stored and, also, is capable of supplying, to the interior, a pressurization gas that applies pressure to a liquid surface of the liquid oxidizer in the interior, a gas discharger that is provided in the tank and that discharges gas, obtained by the liquid oxidizer vaporizing in the interior, out of the tank, a supply pipe that includes an inflow end through which the liquid oxidizer flows in, and an outflow end through which the liquid oxidizer flows out, the inflow end being immersed in the liquid oxidizer in the interior of the tank, the outflow end being connected to the flow channel of the solid fuel disposed downward from the tank, the supply pipe constituting a pipe passage through which the liquid oxidizer flows from the inflow end to the outflow end, and a gas valve capable of switching between a pressurization stop state in which a supply of the pressurization gas to the tank is cut off and, also, the gas is discharged from the gas discharger, and a pressurization state in which the discharging of the gas from the gas discharger is cut off and, also, the pressurization gas is supplied to the tank and, thereby, the liquid oxidizer is pushed by the pressurization gas from the inflow end through the outflow end and to the flow channel of the solid fuel, wherein the supply pipe includes, between the inflow end and the outflow end along the pipe passage, an upward protrusion protruding upward from a top surface of the tank, the upward protrusion constituting a portion of the pipe passage, wherein the supply pipe further includes:

an upward guide including one end that constitutes the inflow end and another end that is connected to the upward protrusion, the upward guide guiding the liquid oxidizer upward from the inflow end toward the upward protrusion, a turn-back that constitutes the upward protrusion, the turn-back turning the liquid oxidizer that is guided upward by the upward guide back toward the interior of the tank, and a downward guide including one end that is connected to the turn-back and another end that constitutes the outflow end, the downward guide guiding the liquid oxidizer, that is turned back downward at the turn-back, downward toward the flow channel of the solid fuel, and in a case in which the gas valve is set to the pressurization stop state, when the liquid oxidizer is injected into the tank, a void from at least the upper protrusion to the outflow end of the pipe passage is secured.

2. The hybrid rocket according to claim 1, wherein the downward guide guides the liquid oxidizer, that is turned back downward at the turn-back, downward through the interior of the tank toward the flow channel of the solid fuel.

3. The hybrid rocket according to claim 1, further comprising:

a gas guide pipe for guiding, to the flow channel of the solid fuel, the gas discharged from the gas discharger.

4. The hybrid rocket according to claim 3, wherein the gas guide pipe connects the gas discharger and a portion of the supply pipe constituting the void, and the gas discharged from the gas discharger is supplied to the flow channel of the solid fuel through the gas guide pipe and the void.

5. The hybrid rocket according to claim 1, wherein the supply pipe includes an outer pipe including one end that constitutes the inflow end and another end that constitutes the upward protrusion, and an inner pipe that passes through an interior of the outer pipe, the inner pipe including one end that is open to an interior of the upward protrusion, and another end that constitutes the outflow end, and the liquid oxidizer is guided upward from the inflow end toward the upward protrusion by an inner surface of the outer pipe and an outer surface of the inner pipe, the liquid oxidizer flows into the one end of the inner pipe in the upward protrusion, and the liquid oxidizer that has flowed in is guided to the flow channel of the solid fuel by the inner pipe.

\* \* \* \* \*